(12) United States Patent
Tojo

(10) Patent No.: US 8,203,748 B2
(45) Date of Patent: Jun. 19, 2012

(54) IMAGE PROCESSING APPARATUS, CONTROL METHOD THEREFOR, AND PROGRAM

(75) Inventor: Hiroshi Tojo, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 770 days.

(21) Appl. No.: 10/847,573

(22) Filed: May 18, 2004

(65) Prior Publication Data
US 2004/0234169 A1 Nov. 25, 2004

(30) Foreign Application Priority Data

May 20, 2003 (JP) .................................. 2003-142408
Mar. 11, 2004 (JP) .................................. 2004-069487

(51) Int. Cl.
*G06K 9/00* (2006.01)
*H04N 1/60* (2006.01)

(52) U.S. Cl. ........ 358/1.9; 358/403; 358/401; 358/1.16; 382/305; 382/243

(58) Field of Classification Search .................. 382/305, 382/243; 358/1.9, 403, 401, 1.16
See application file for complete search history.

(56) References Cited

U.S. PATENT DOCUMENTS

| | | | |
|---|---|---|---|
| 5,991,466 A | 11/1999 | Ushiro et al. ................. 382/305 |
| 6,181,818 B1 | 1/2001 | Sato et al. ..................... 382/170 |
| 6,246,804 B1 * | 6/2001 | Sato et al. ..................... 382/284 |
| 6,785,429 B1 * | 8/2004 | Senoh ........................... 382/305 |
| 7,034,951 B1 * | 4/2006 | Jones et al. ................... 358/1.12 |
| 2002/0028020 A1 * | 3/2002 | Fujiwara et al. .............. 382/190 |
| 2002/0069228 A1 * | 6/2002 | Mori et al. .................... 707/524 |
| 2002/0186413 A1 * | 12/2002 | Ito ................................. 358/1.18 |
| 2002/0196465 A1 * | 12/2002 | Ohta ............................ 358/1.16 |
| 2003/0081678 A1 | 5/2003 | Fukuda .................... 375/240.14 |
| 2003/0086021 A1 | 5/2003 | Tojo ............................. 348/700 |
| 2004/0218838 A1 | 11/2004 | Tojo et al. ..................... 382/305 |

FOREIGN PATENT DOCUMENTS

| | | |
|---|---|---|
| EP | 0 643 358 A2 | 3/1995 |
| EP | 0 657 831 A1 | 6/1995 |
| EP | 0 987 637 A2 | 3/2000 |
| JP | 3-017851 B2 | 3/1991 |
| JP | B 3017851 | 12/1999 |
| JP | 2001-257862 A | 9/2001 |

OTHER PUBLICATIONS

Patent Abstracts of Japan, Publication No. 05-037748, Feb. 12, 1993, corresponding to Japanese Patent No. JPB 3017851.
Patent Abstract of Japan, vol. 2000, No. 19, Jun. 5, 2001 (JP 2001-043239).

* cited by examiner

*Primary Examiner* — David K Moore
*Assistant Examiner* — Quang N Vo
(74) *Attorney, Agent, or Firm* — Fitzpatrick, Cella, Harper & Scinto

(57) ABSTRACT

A printed material is electrically read, and electrical data of the printed material is input as a reference comparison image. The feature amount of a region to be processed containing a page image contained in the reference comparison image is extracted. A target comparison image corresponding to the reference comparison image is retrieved from a storage medium by using the extracted feature amount. The retrieved image is processed.

18 Claims, 27 Drawing Sheets

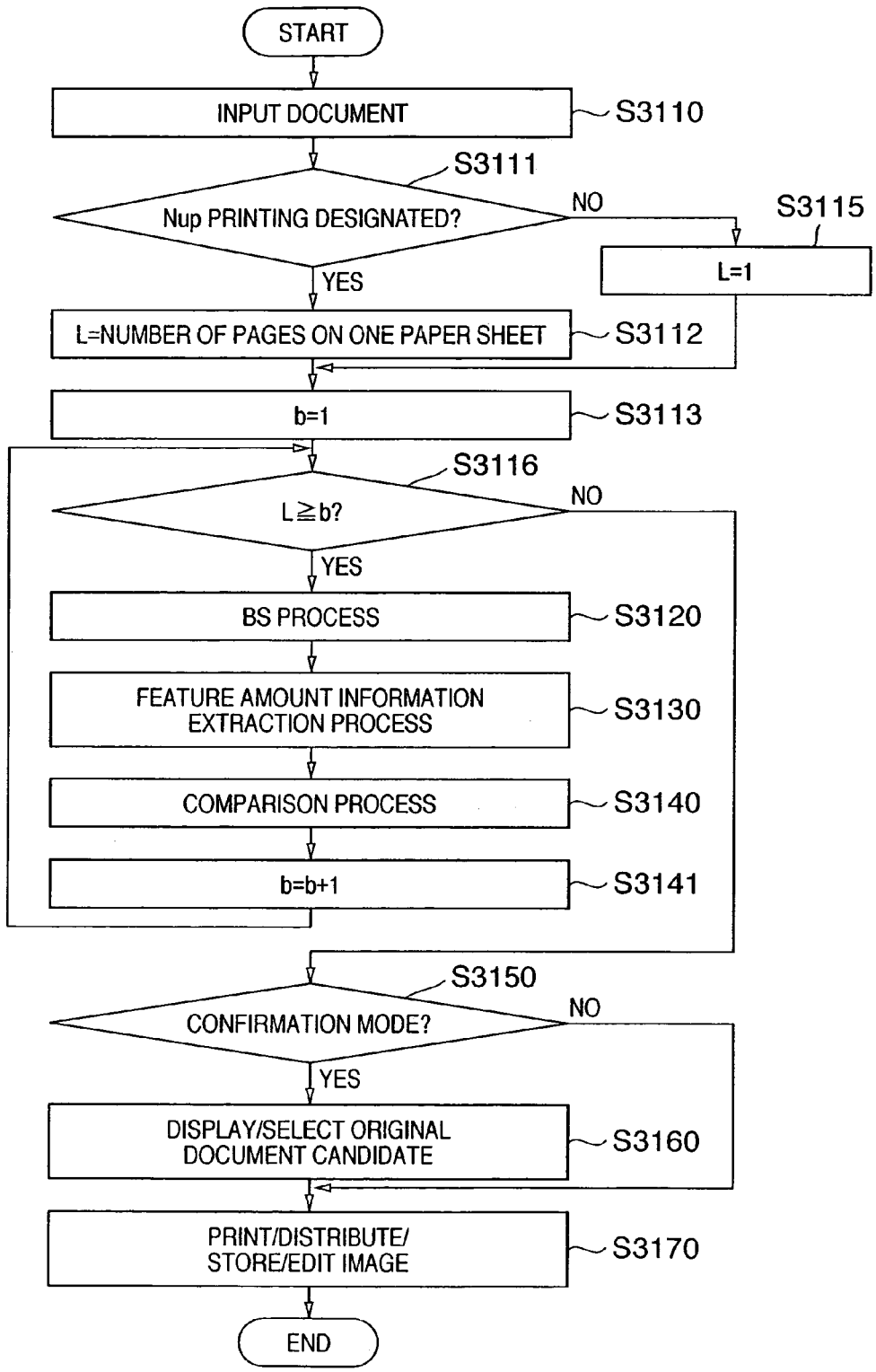

FIG. 4

| DOCUMENT ID | ADDRESS |
|---|---|
| 0000001 | ¥¥abc¥doc¥ship.doc |
| 0000002 | C:¥img¥car.bmp |

F I G. 5

| DOCUMENT ID | PAGE NUMBER | BLOCK ID | ATTRIBUTE | SIZE | POSITION |
|---|---|---|---|---|---|
| 0000001 | 1 | 0001 | IMAGE | 30 | 5, 5 |
| 0000001 | 1 | 0002 | IMAGE | 40 | 5, 50 |
| 0000001 | 1 | 0003 | TEXT | 30 | 80, 5 |
| 0000001 | 2 | 0001 | TEXT | 40 | 5, 5 |
| 0000001 | 2 | 0002 | IMAGE | 60 | 5, 45 |
| 0000002 | 1 | 0001 | IMAGE | 30 | 15, 5 |
| 0000002 | 1 | 0002 | IMAGE | 35 | 15, 50 |
| 0000002 | 1 | 0003 | TEXT | 35 | 75, 5 |

FIG. 6

| DOCUMENT ID | PAGE NUMBER | BLOCK ID | COLOR FEATURE AMOUNT |
|---|---|---|---|
| 0000001 | 1 | 0001 | ... |
| 0000001 | 1 | 0002 | ... |
| 0000001 | 2 | 0002 | ... |
| 0000002 | 1 | 0001 | ... |
| 0000002 | 1 | 0002 | ... |

FIG. 7

| DOCUMENT ID | PAGE NUMBER | BLOCK ID | TEXT FEATURE AMOUNT |
|---|---|---|---|
| 0000001 | 1 | 0003 | . . . |
| 0000001 | 2 | 0001 | . . . |
| 0000002 | 1 | 0003 | . . . |

FIG. 12

| 1 | 2 | 4 |
|---|---|---|
| 3 | 5 | 7 |
| 6 | 8 | 9 |

F I G. 13
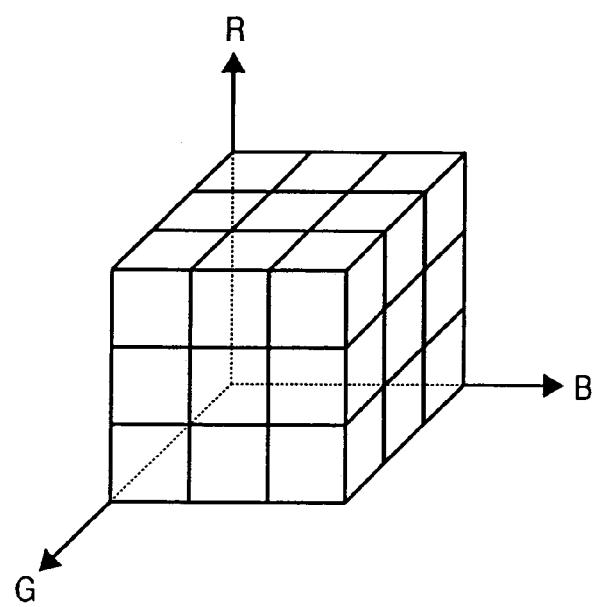

FIG. 18

|   | 1 | 2 | 3 | 4 | 5 | 6 | 7 | 8 | . . . . |
|---|---|---|---|---|---|---|---|---|---------|
| 1 | 0 | 1 | 1 | 5 | 1 | 5 | 7 | 7 | . . . . |
| 2 |   | 0 | 2 | 1 | 1 | 7 | 2 | 5 | . . . . |
| 3 |   |   | 0 | 7 | 1 | 1 | 5 | 2 | . . . . |
| 4 |   |   |   | 0 | 1 | 9 | 1 | 7 | . . . . |
| : |   |   |   |   |   |   |   |   |         |

F I G. 21
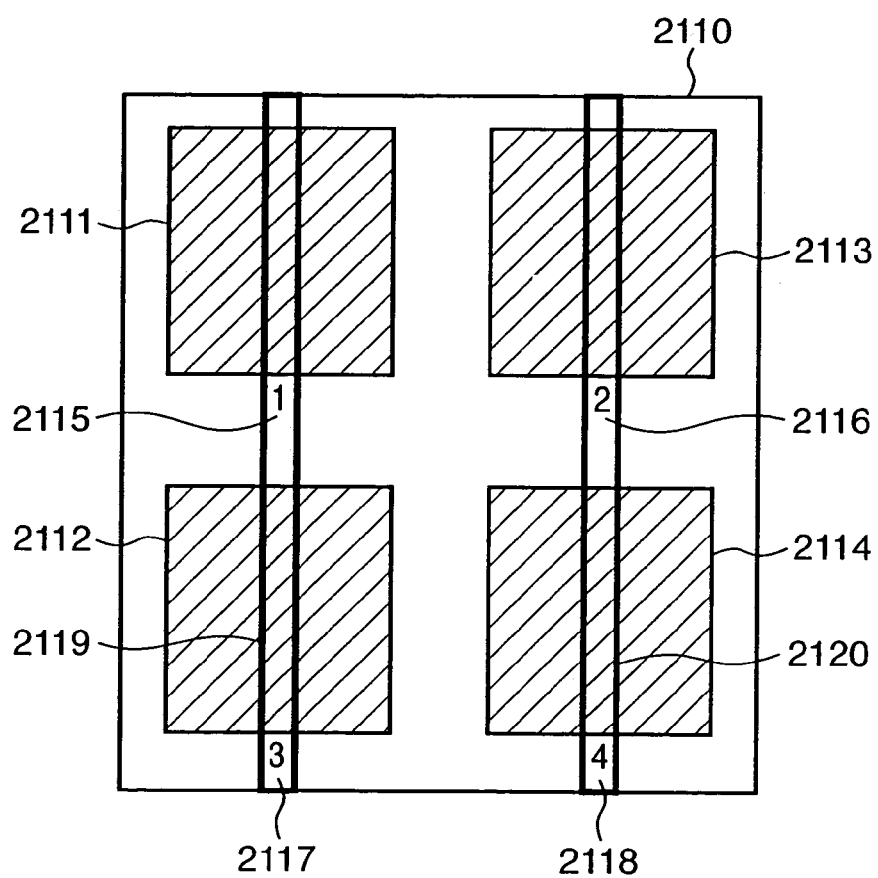

IMAGE PROCESSING APPARATUS, CONTROL METHOD THEREFOR, AND PROGRAM

FIELD OF THE INVENTION

The present invention relates to an image processing technique capable of retrieving corresponding original electronic data from a paper document read by an image input apparatus such as a copying machine, and utilizing the original electronic data for printing, distribution, storage, editing, and the like.

BACKGROUND OF THE INVENTION

Recently, digital copying machines and network copying machines have advanced. Various printing functions are also proposed, and a plurality of pages contained in a single document or a plurality of documents can be laid out and printed on one paper sheet.

For example, materials often distributed at a meeting and the like are merely a reference, and in many cases, an N-page document is laid out and printed on one paper sheet such that two or four pages of one document are laid out and printed on one paper sheet (to be referred to as N-page printing hereinafter). When the pages of documents must be referred to at once, they are sometimes coupled and printed (to be referred to as coupled printing hereinafter). Further, page numbers may be printed in an order of bookbinding so as to fold a document into two after printing (to be referred to as bookbinding printing hereinafter).

Printing of laying out an N-page document and printing it on one paper sheet, such as N-page printing, coupled printing, and bookbinding printing, will be called Nup printing.

There is proposed a system capable of reading a paper document by a scanner, retrieving original electronic data of the read paper document image, and printing the image from the original electronic data itself, distributing the original electronic data to a desired terminal such as a PC (Personal Computer) within a network, saving it in a desired storage medium within a network, or editing it.

As a method for realizing this, for example, in Japanese Patent No. 3017851, original electronic data of scanned electronic data can be retrieved by comparing bit by bit the scanned electronic data obtained by scanning a paper document and electronic data in a storage medium.

For example, in Japanese Patent Laid-Open No. 2001-257862, when a paper document is to be converted into electronic data, an identification code is added to the electronic data to generate a printed material containing the identification code. To retrieve or print electronic data corresponding to the printed material, the printed material is loaded to recognize the printed identification code, thereby retrieving or printing desired electronic data.

However, the above references do not consider any Nup-printed document, and the following problems arise in an environment where Nup printing is adopted.

For example, in Japanese Patent No. 3017851, electronic data obtained by scanning an Nup-printed document is interpreted as one page. To the contrary, original electronic data is managed for each page in a storage medium, and thus no high similarity can be obtained by a comparison with any electronic data. Thus, no original electronic data can be retrieved.

For example, in Japanese Patent Laid-Open No. 2001-257862, the print position of an identification code on each page is determined. In Nup printing, the print position shifts, and each identification code cannot be read. As a result, no original electronic data can be retrieved.

SUMMARY OF THE INVENTION

The present invention has been made to overcome the conventional drawbacks, and has as its object to provide an image processing apparatus capable of retrieving and utilizing original electronic data from an Nup-printed paper document, a control method therefor, and a program.

According to the present invention, the foregoing object is attained by providing an image processing apparatus comprising:

storage means for storing a plurality of electronic data as target comparison images;

input means for inputting electronic data of a printed material as a reference comparison image by electrically reading the printed material;

extraction means for extracting a feature amount of a region to be processed containing a page image contained in the reference comparison image, on the basis of the number of page images contained in the reference comparison image; and retrieval means for retrieving a target comparison image corresponding to the reference comparison image from the storage means by using the feature amount extracted by the extraction means.

In a preferred embodiment, the apparatus further comprise processing means for processing an image serving as a retrieval result of the retrieval means.

In a preferred embodiment, the apparatus comprise designation means for designating page numbers of page images contained in the reference comparison image, wherein the extraction means extracts the feature amount of the region to be processed for each region to be processed that is determined on the basis of the page numbers designated by the designation means.

In a preferred embodiment, the extraction means extracts one or both of an image feature amount and a text feature amount of the region to be processed.

In a preferred embodiment, the image feature amount includes one or an arbitrary combination of a color feature amount, a brightness feature amount, a texture feature amount, and a shape feature amount.

In a preferred embodiment, the text feature amount includes a character code.

In a preferred embodiment, the apparatus further comprises display means for displaying a retrieval result by the retrieval means; and selection means for, when the display means displays a plurality of target comparison images as retrieval results by the retrieval means, selecting a desired image from the plurality of target comparison images.

In a preferred embodiment, the apparatus further comprises designation means for, when the reference comparison image is formed by a plurality of page images, designating a desired page image from the plurality of page images, wherein the extraction means extracts the feature amount of the region to be processed containing the page image designated by the designation means.

In a preferred embodiment, the processing means prints an image retrieved by the retrieval means under a designated printing condition.

In a preferred embodiment, the apparatus further comprises designation means for designating a type of process for an image serving as a retrieval result, wherein the type of process includes one of printing, distribution, storage, and editing.

In a preferred embodiment, the apparatus further comprises first determination means for determining whether the reference comparison image contains a plurality of page images, and second determination means for, when the reference comparison image contains a plurality of page images as a result of determination by the first determination means, determining page numbers of the page images contained in the reference comparison image, wherein the extraction means extracts the feature amount of the region to be processed for each region to be processed that is determined on the basis of the page numbers determined by the second determination means.

In a preferred embodiment, the first determination means determines whether the reference comparison image contains a plurality of page images, by detecting the page numbers contained in the reference comparison image and determining whether the page numbers exist at equal intervals within a predetermined region.

In a preferred embodiment, the first determination means determines whether the reference comparison image contains a plurality of page images, by detecting a rightmost margin or a leftmost margin and a remaining intermediate margin of the reference comparison image, and determining whether the detected intermediate margin is larger than the rightmost margin or the leftmost margin.

In a preferred embodiment, the apparatus further comprises display means for displaying a determination result of the first determination means, and correction means for correcting the determination result.

In a preferred embodiment, the apparatus further comprises input means for inputting the target comparison image, and designation means for designating page numbers of page images contained in the target comparison image input by the input means, wherein the extraction means extracts the feature amount of the region to be processed for each region to be processed that is determined on the basis of the page numbers designated by the designation means, and the storage means stores the target comparison image and the feature amount extracted by the extraction means in correspondence with each other.

In a preferred embodiment, the apparatus further comprises input means for inputting the target comparison image, first determination means for determining whether the target comparison image contains a plurality of page images, and second determination means for, when the target comparison image contains a plurality of page images as a result of determination by the first determination means, determining page numbers of the page images contained in the reference comparison image, wherein the extraction means extracts the feature amount of the region to be processed for each region to be processed that is determined on the basis of the page numbers determined by the second determination means, and the storage means stores the target comparison image and the feature amount extracted by the extraction means in correspondence with each other.

According to the present invention, the forgoing object is attained by providing a method of controlling an image processing apparatus, comprising:

an input step of inputting, as a reference comparison image, electronic data obtained by electrically reading a printed material;

an extraction step of extracting a feature amount of a region to be processed containing a page image contained in the reference comparison image on the basis of the number of page images contained in the reference comparison image; and a retrieval step of retrieving a target comparison image corresponding to the reference comparison image from a plurality of electronic data stored as target comparison images in a storage medium by using the feature amount extracted in the extraction step.

According to the present invention, the forgoing object is attained by providing a program which realizes control of an image process by a computer, comprising:

a program code for an input step of inputting, as a reference comparison image, electronic data obtained by electrically reading a printed material;

a program code for an extraction step of extracting a feature amount of a region to be processed containing a page image contained in the reference comparison image on the basis of the number of page images contained in the reference comparison image; and a program code for a retrieval step of retrieving a target comparison image corresponding to the reference comparison image from a plurality of electronic data stored as target comparison images in a storage medium by using the feature amount extracted in the extraction step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 3B is a flowchart showing a retrieval process according to the first embodiment of the present invention;

FIG. 4 is a table showing an example of address information according to the first embodiment of the present invention;

FIG. 5 is a table showing an example of block information according to the first embodiment of the present invention;

FIG. 6 is a table showing an example of feature amount information according to the first embodiment of the present invention;

FIG. 7 is a table showing another example of feature amount information according to the first embodiment of the present invention;

FIG. 12 is a view showing an example of an order decision table according to the first embodiment of the present invention;

FIG. 13 is a view showing an example of the arrangement of color bins in the color space according to the first embodiment of the present invention;

FIG. 18 is a view showing an example of the structure of a color bin penalty matrix according to the first embodiment of the present invention;

FIG. 21 is a view showing an example of Nup-printing a 4-page document on one paper sheet according to the second embodiment of the present invention;

DETAILED DESCRIPTION OF THE PREFERRED EMBODIMENT

Preferred embodiments of the present invention will be described in detail in accordance with the accompanying drawings.

<<First Embodiment>>

Figure 1:
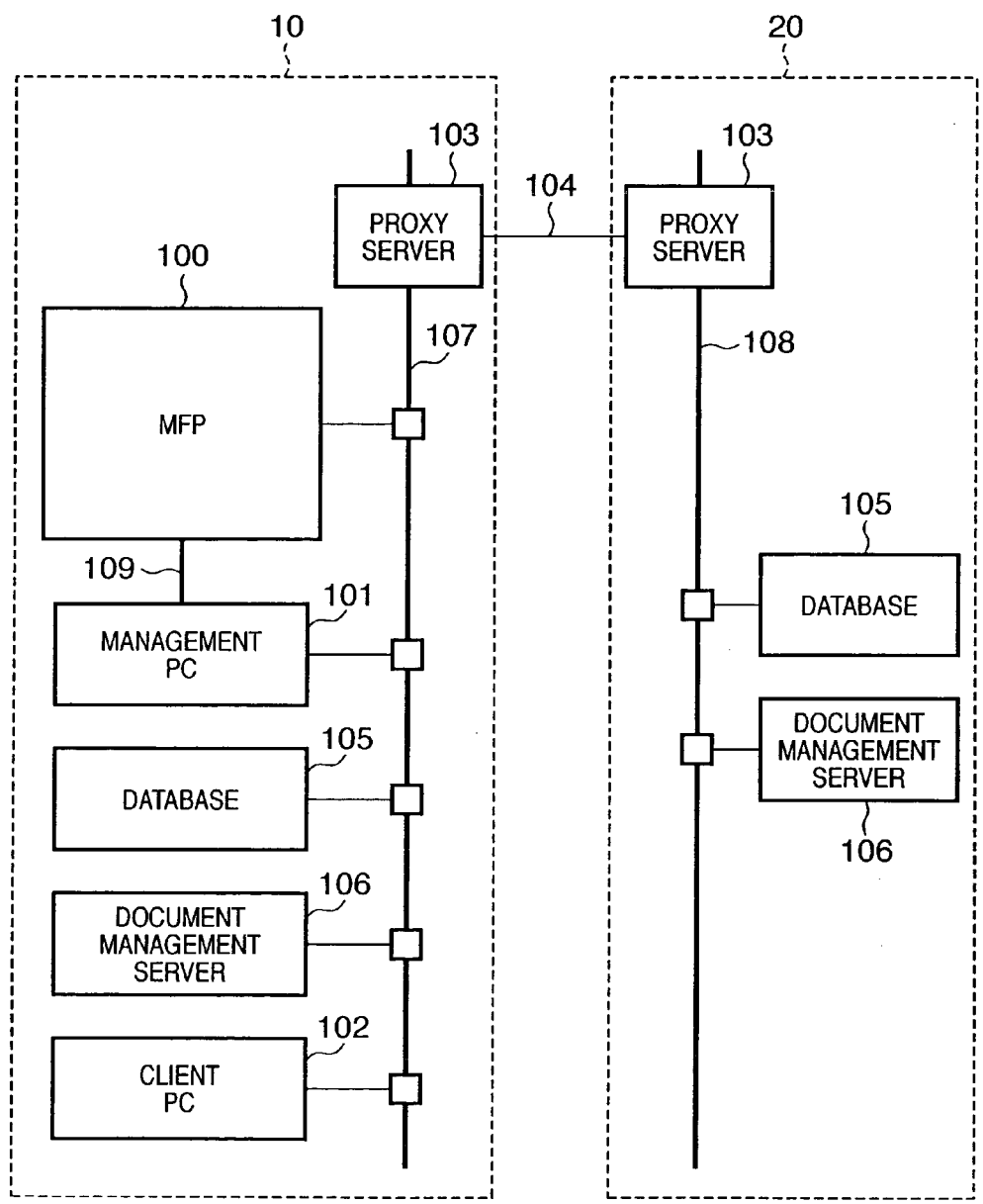
FIG. 1 is a block diagram showing the configuration of an image processing system according to the first embodiment of the present invention.

FIG. 1 is a block diagram showing the configuration of an image processing system according to the first embodiment of the present invention.

The image processing system is implemented in an environment where offices 10 and 20 are connected by a network 104 such as the Internet.

A LAN 107 constructed in the office 10 is connected to an MFP (Multi Function Peripheral) 100 serving as a multifunction apparatus which realizes a plurality of types of functions, a management PC 101 which controls the MFP 100, a client PC 102, a document management server 106, a database 105 for the server 106, and a proxy server 103.

The LAN 107 in the office 10 and a LAN 108 in the office 20 are connected to the network 104 via the proxy servers 103 of the two offices.

The MFP 100 comprises an image reader which electronically reads particularly a paper document, and an image processor which executes image processes for an image signal obtained from the image reader. The image signal can be transmitted to the management PC 101 via a LAN 109.

The management PC 101 is a general PC, and incorporates various building components such as an image storage unit, image processor, display, and input unit. Some of the building components are integrated into the MFP 100.

The network 104 is a so-called communication network which is typically realized by one or a combination of the Internet, LAN, WAN, telephone line, dedicated digital circuit, ATM, frame relay line, communication satellite channel, cable television line, data broadcasting radio channel, and the like as far as the network enables data exchange.

Various terminals such as the management PC 101, client PC 102, and document management server each have standard building components (e.g., CPU, RAM, ROM, hard disk, external storage, network interface, display, keyboard, and mouse) which are standard equipment for a general-purpose computer.

The detailed arrangement of the MFP 100 will be explained with reference to FIG. 2.

Figure 2:
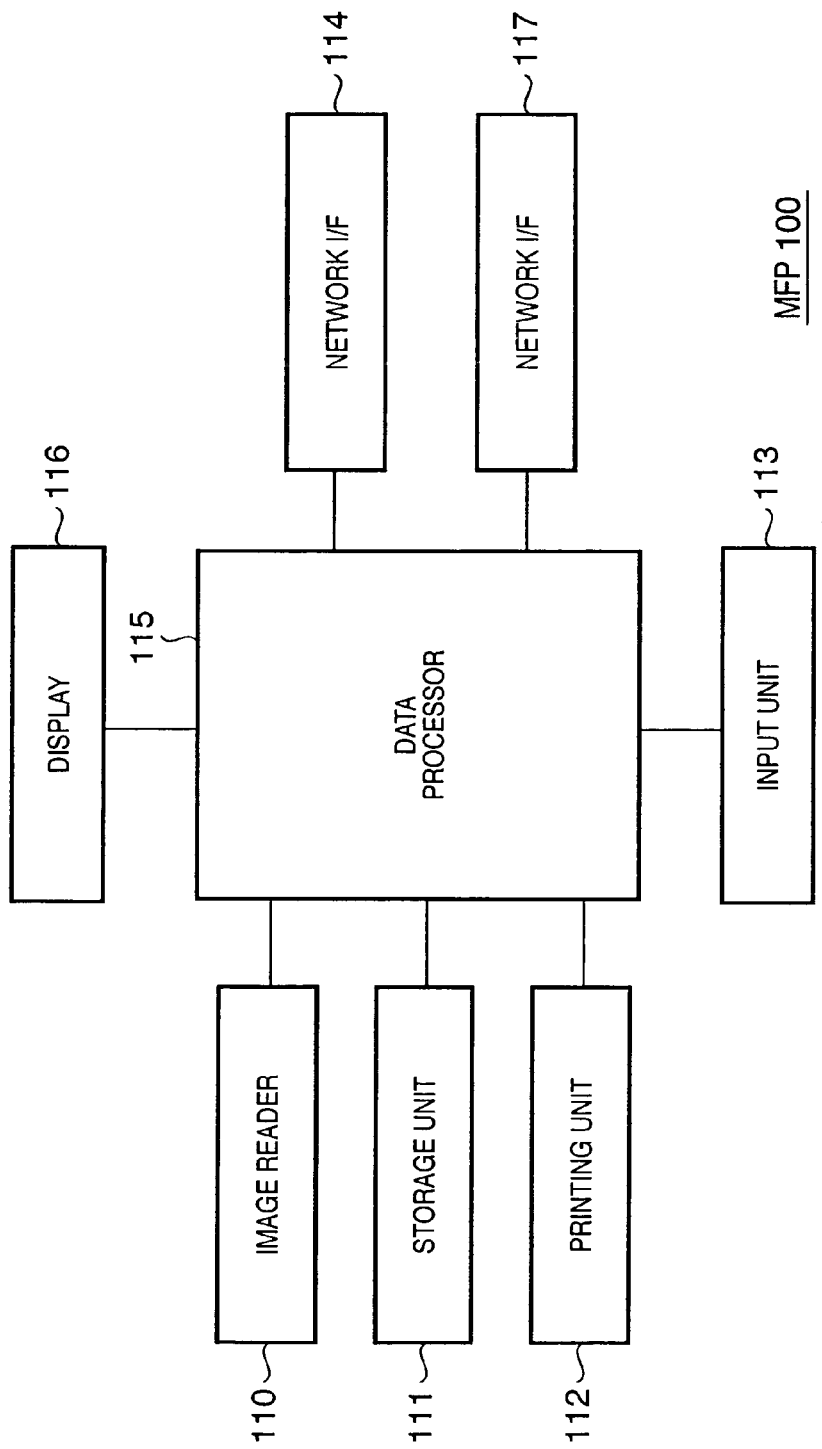
FIG. 2 is a block diagram showing the detailed arrangement of an MFP according to the first embodiment of the present invention.

FIG. 2 is a block diagram showing the detailed arrangement of the MFP according to the first embodiment of the present invention.

In FIG. 2, an image reader 110 including a document table and auto document feeder (ADF) irradiates a bundle or one of document images with a light source (not shown), forms a reflected document image on a solid-state image sensing element via a lens, and obtains a raster image reading signal from the solid-state image sensing element as a raster image at a predetermined density (600 DPI or the like).

The MFP 100 has a copying function of printing an image corresponding to an image reading signal on a printing medium by a printing unit 112. To form a copy of a document image, the image reading signal is processed by a data processor 115 to generate a printing signal, and the printing signal is printed on a printing medium by the printing unit 112. To form copies of a document image, a printing signal for one copy is temporarily stored and held in a storage unit 111, and such printing signals are sequentially output to the printing unit 112 to print them on printing media.

When Nup printing is to be performed, image signals of pages designated by the data processor 115 are reduced and laid out so as to be able to print them on one paper sheet. The resultant data is output to the printing unit 112 to print on a printing medium.

A printing signal output from the client PC 102 is received by the data processor 115 via the LAN 107 and a network I/F 114. The data processor 115 converts the printing signal into raster data printable by the printing unit 112, and the printing unit 112 prints the data on a printing medium.

An instruction from the operator to the MFP 100 is input from an input unit 113 formed by a key operation unit attached to the MFP 100 and a keyboard and mouse connected to the management PC 101. A series of operations are controlled by a controller (not shown) in the data processor 115. An operation input state and image data during processing are displayed on a display 116.

The storage unit 111 is also controlled by the management PC 101. Data exchange and control between the MFP 100 and the management PC 101 are performed via a network I/F 117 and the LAN 109.

In the MFP 100, a user interface which provides the user with various operations and displays for executing various processes (to be described later) is implemented by the display 116 and input unit 113.

Processes executed by the image processing system according to the present invention are roughly classified into two processes: a registration process of registering image data and a retrieval process of retrieving desired image data.

In the first embodiment, in order to increase the processing efficiency of the overall image processing system, various processes (to be described later) are executed by distributing them to various terminals which form the image processing system. These processes may be executed in one terminal (e.g., the MFP 100).

The registration process will be first explained.

[Outline of Registration Process]

As a method of registering target image data, image data generated by scanning and inputting a paper document is registered, or image data prepared by rasterizing an electronic document created by a document creation application or the like into a raster image is registered.

The outline of the registration process of registering an original document will be described with reference to FIG. 3A.

Figure 3A:
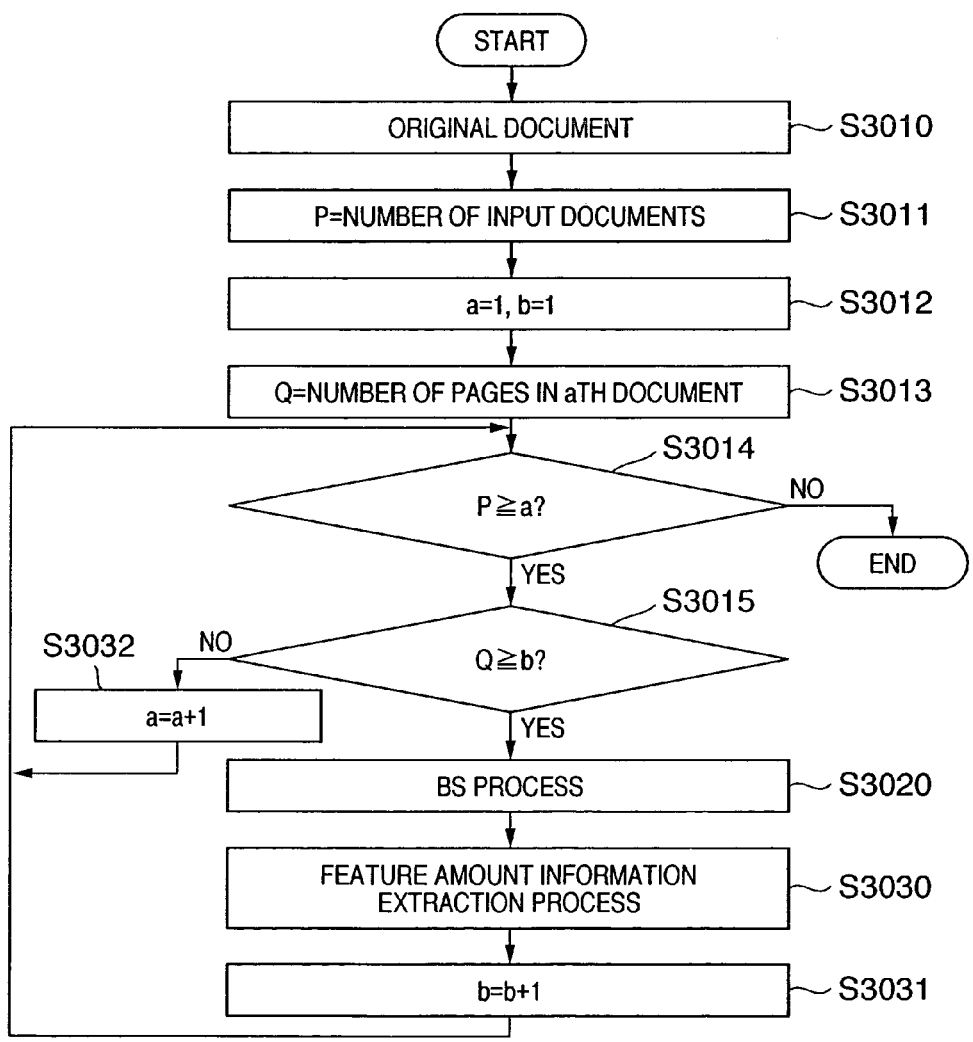
FIG. 3A is a flowchart showing a registration process according to the first embodiment of the present invention.

FIG. 3A is a flowchart showing the registration process according to the first embodiment of the present invention.

This process starts when a paper document to be registered is set in the ADF of the image reader 110 and the registration button of the input unit 113 is manipulated. A paper document to be registered can have one or a plurality of pages. For a plurality of pages, image data (page images) obtained from the paper document are managed as one file.

In step S3010, an original document to be registered is input. Along with this input, various pieces of information for managing an original document are generated and stored in the storage unit 111.

There are two original document input methods in registering an original document.

When the original document is electronic data, the electronic data is stored in the hard disk of the client PC 102, the database 105 of the document management server 106 in the office 10 or 20, or the storage unit 111 of the MFP 100. Electronic data of an original document to be registered is read out from the storage source, input to the data processor 115 via the network I/F 114, and converted into a raster image by the data processor 115.

When the original document is a paper document, the paper document is raster-scanned by the image reader 110 of the MFP 100 to obtain a raster image.

In this manner, the first embodiment can process both electronic data and a paper document as an original document to be registered. The raster image is pre-processed by the data processor 115 and saved in the storage unit 111 (in subsequent processes, the raster image is used as electronic data of an original document for a paper document). At this time, a unique document ID is issued for each original document to be registered, and saved as address information in the storage unit 111 in correspondence with the address of the electronic data of the original document.

The address is full path information which is formed by a URL, server name, directory, and file name and represents an electronic data storage destination. An example of address information is shown in FIG. 4. The address information storage destination is the database 105, storage unit 111, or the like.

The file format of electronic data when the original document is a paper document is, e.g., BMP, but is not limited to this and may be any file format (e.g., GIF or JPEG) capable of saving color information.

The file format of electronic data when the original document is electronic data is a file format (*.doc or *.pdf) depending on an application (e.g., MS-Word available from Microsoft® or Acrobat available from Adobe Systems®) which creates the electronic data.

In step S3011, the number of documents input in step S3010 is set as an input document count P. In step S3012, "1" is set as the default value of a variable a representing the number of processing documents and the default value of a variable b representing the number of processing pages in one document to be processed. In step S3013, the number of pages in the ath document is set as a page count Q of one document.

Whether P is equal to or larger than a is determined as end determination. If P is smaller than a (NO in step S3014), the process ends. If P is equal to or larger than a (YES in step S3014), an unprocessed document exists, and the process continues.

In step S3015, whether Q is equal to or larger than b is determined as end determination of each document. If Q is smaller than b (NO in step S3015), the process advances to step S3032 to increment a by one, and returns to step S3014 to change the processing target to the next document. If Q is equal to or larger than b (YES in step S3015), an unprocessed page exists, and the process continues.

A block selection (BS) process is performed for Q pages of the Pth document. This process is executed under the control of the management PC 101.

More specifically, the CPU of the management PC 101 segments the raster image of the original document to be processed that is stored in the storage unit 111, into a text/line image part and halftone image part. The CPU further segments the text/line part into blocks of paragraphs, or tables or pictures formed by lines.

The halftone image part is segmented into blocks such as an image part and background part of blocks separated into rectangles.

A block ID which specifies the page number of a page to be processed and each block in the page is issued. The attribute (image, text, or the like) of each block, the size, the position (coordinates within the page) in the original document, and the block are associated and stored as block information in the storage unit 111. An example of the block information is shown in FIG. 5.

In step S3030, the data processor 115 performs a feature amount information extraction process of extracting feature amount information of each block in accordance with the type of block.

Especially, a text block undergoes an OCR process to extract a character code as a text feature amount. An image feature amount pertaining to the color is extracted from an image block. At this time, feature amounts corresponding to respective blocks are integrated for each original document, and stored as feature amount information in the storage unit 111 in association with a document ID, page number, and block ID. Examples of feature amount information are shown in FIGS. 6 and 7.

In step S3031, b is incremented by one, and the process returns to step S3014 to shift the processing target to the next page.

[Outline of Retrieval Process]

Next, the outline of the retrieval process of retrieving electronic data of an original document will be described with reference to FIG. 3B.

FIG. 3B is a flowchart showing the retrieval process according to the first embodiment of the present invention.

In step S3110, a paper document serving as a retrieval condition is input. This process is the same as the process in step S3010, and a description thereof will be omitted. Note that a raster image generated by this process is merely temporarily saved, and address information for the paper document need not be saved in the storage unit 111.

In step S3111, whether the user has designated Nup printing is determined. If Nup printing has been designated (YES in step S3111), the process advances to step S3112 to set, as a page count L, the number of pages on one paper sheet designated by the user. If no Nup printing has been designated (NO in step S3111), the process advances to step S3115 to regard the number of pages as one on one paper sheet and set "1" as the page count L.

In step S3113, "1" is set as the default value of the variable b representing the number of processing pages in one document to be processed. Whether L is equal to or larger than b is determined as end determination of the comparison process. If L is smaller than b (NO in step S3116), the process advances to step S3150. If L is equal to or larger than b (YES in step S3116), an unprocessed page exists, and the process advances to step S3120 and continues.

In step S3120, the block selection (BS) process is done for the image region of the bth page in the raster image.

A concrete example of the block selection process will be explained with reference to FIG. 8.

Figure 8:
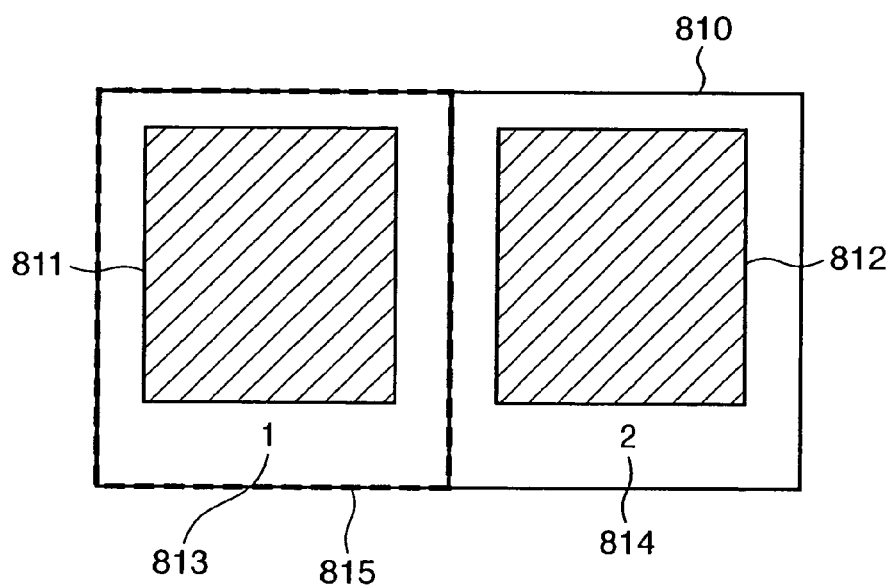
FIG. 8 is a view showing an example of Nup-printing two pages according to the first embodiment of the present invention.

FIG. 8 shows an example of Nup-printing two pages. In FIG. 8, reference numeral 810 denotes a region of one entire paper sheet; 811 and 812, page images of respective pages; and 813 and 814, page numbers of the pages. For b=1, the block selection process is performed for only a target processing region 815 including the page image 811 of the first page. In the example of FIG. 8, for b=2, the block selection process is done for the target processing region including the page image 812 of the second page.

The block selection process is the same as that in step S3020, and a description thereof will be omitted. Note that the attribute, size, and position of each block generated by the block selection process are merely temporarily saved, and block information for the paper document need not be saved in the storage unit 111.

The target processing region is determined on the basis of a predetermined processing order by segmenting a paper document on one paper sheet into L regions on the basis of the L value and the orientation of the paper document.

In step S3130, a feature amount information extraction process of extracting feature amount information of each block is executed. This process is the same as the process in step S3030, and a description thereof will be omitted. Note that the feature amount of each block generated by this process is merely temporarily saved, and feature amount information for the paper document need not be saved in the storage unit 111.

In step S3140, feature amount information of the image (reference comparison image) of the bth page in the input paper document and feature amount information of the electronic data (target comparison image) stored in the hard disk of the client PC 102, the database 105 of the document management server 106 in the office 10 or 20, or the storage unit 111 of the MFP 100 are compared to calculate the similarity. An original document candidate is determined as a retrieval result on the basis of the similarity.

In step S3141, b is incremented by one, and the process returns to step S3116 to shift the processing target to the next page.

If L is smaller than b in step S3116 (NO in step S3116), the process advances to step S3150 to determine whether a user confirmation mode has been set.

In the user confirmation mode, whether an original document desired by the user has been retrieved from original document candidates obtained by a comparison process is confirmed. More specifically, a user interface containing original document candidates is implemented by the display 116 and input unit 113. The user interface allows the user to confirm the contents of the original document candidates. Details of the arrangement of the user interface will be described later.

If no user confirmation mode is set in step S3150 (NO in step S3150), a document which is determined in the comparison process to be most similar is automatically selected, and the process advances to step S3170. If the user confirmation mode is set (YES in step S3150), the process advances to step S3160 to display/select an original document candidate. This selection is realized by displaying the thumbnail images of original document candidates on the display 116 and prompting the user to select the thumbnail image of a desired original document candidate from the original document candidates.

In step S3170, the selected original document undergoes one of printing, distribution, storage, and editing of the original document on the basis of a manipulation by the user via the user interface implemented by the display 116 and input unit 113.

As described above, in Nup printing, the block selection process and feature amount information extraction process are performed for each page contained in one document. Similar image retrieval is sequentially executed for pages by using the results of these processes. All electronic data corresponding to pages can be retrieved and utilized.

[Details of Each Process]

Details of each process will be explained.

Details of the block selection process in steps S3020 and S3120 will be described.

Figure 9B:
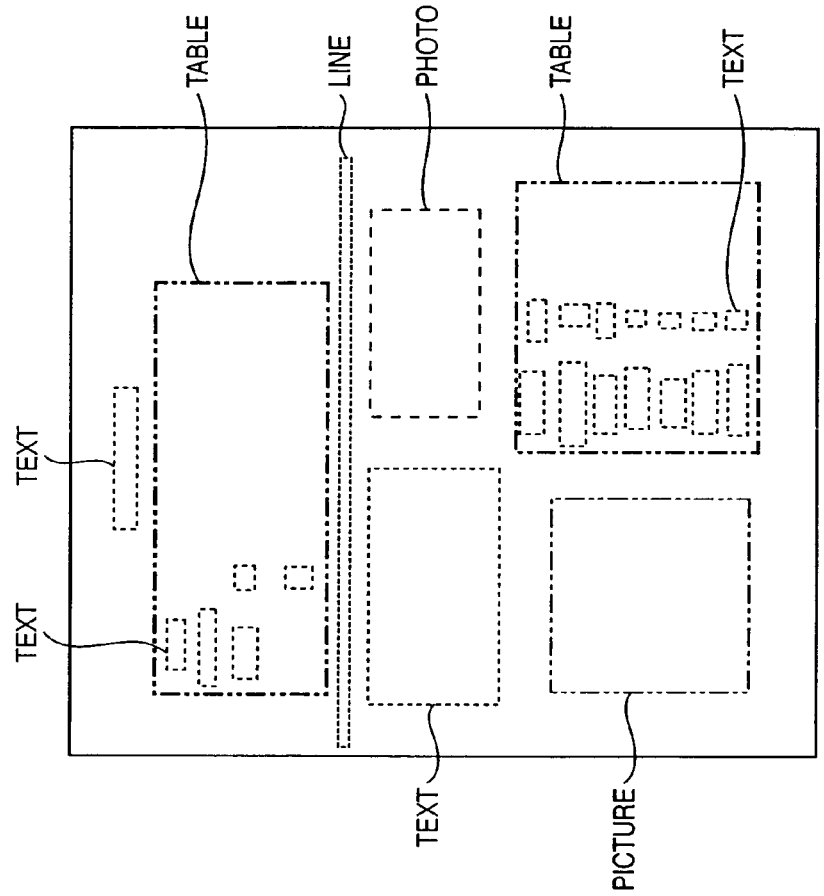
FIGS. 9A and 9B are views showing an example of image block extraction according to the first embodiment of the present invention.
Figure 9A:
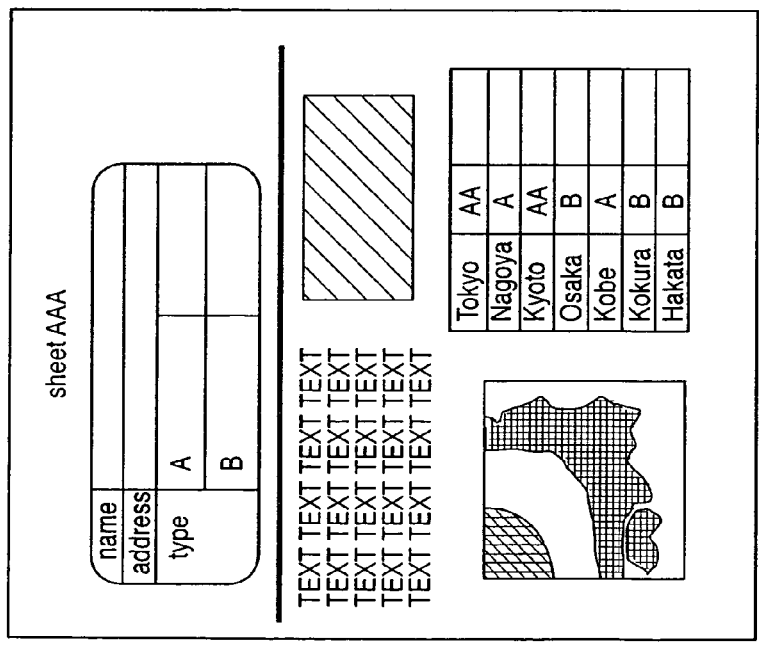

In the block selection process, for example, a raster image in FIG. 9A is recognized as meaningful blocks, as shown in FIG. 9B. The attributes (e.g., TEXT/PICTURE/PHOTO/LINE/TABLE) of the blocks are determined to segment the image into blocks having different attributes.

An embodiment of the block selection process will be described below.

An input image is binarized into a monochrome image, and edge tracking is performed to extract a cluster of pixels surrounded by a black pixel edge. In a cluster of black pixels in a large area, edge tracking is also performed for internal white pixels to extract a cluster of white pixels. Further, a cluster of black pixels is recursively extracted from the cluster of white pixels with a predetermined area or more.

Obtained clusters of black pixels are classified by size and shape into blocks having different attributes. For example, a block having an aspect ratio of almost 1 and a size of a predetermined range is defined as a pixel cluster corresponding to a text. A part of adjacent characters which can be neatly grouped is defined as a text block. A plane pixel cluster is defined as a line block. A range of a black pixel cluster which neatly contains rectangular white pixel clusters with a predetermined size or more is defined as a table block. A region where indefinite pixel clusters scatter is defined as a photo block. A pixel cluster with another arbitrary shape is defined as a picture block.

Details of the feature amount information extraction process in steps S3030 and S3130 will be explained.

The feature amount information extraction process adopts different processing methods for an image block and text block, and these methods will be separately described.

Image blocks include photo and picture blocks in the example of FIG. 9B, but can be limited to at least one of photo and picture blocks in accordance with the application purpose.

A feature amount information extraction process for an image block will be described.

When one document contains a plurality of image blocks, the following process is repeated by the total number of image blocks.

For example, the first embodiment executes a color feature amount information extraction process of extracting the color feature amount of the image color.

Details of the color feature amount information extraction process will be explained with reference to FIG. 10.

Figure 10:
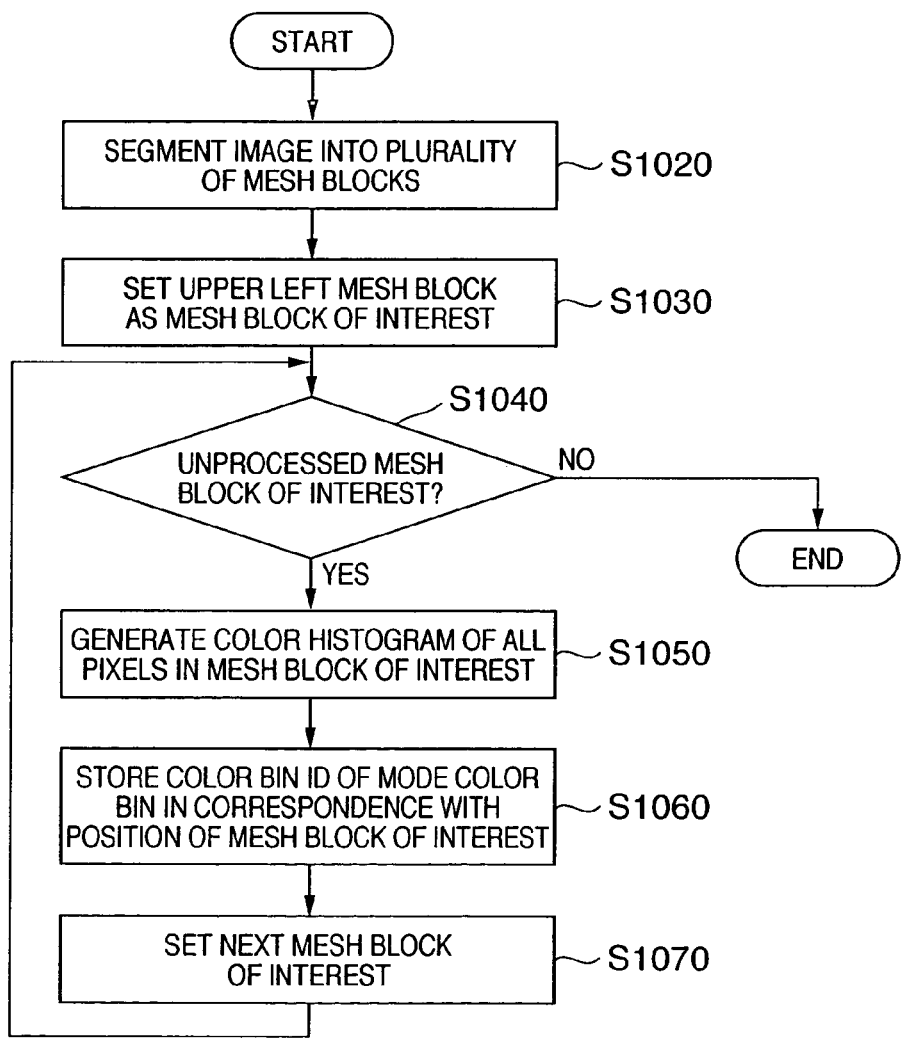
FIG. 10 is a flowchart showing details of a color feature amount information extraction process according to the first embodiment of the present invention.

FIG. 10 is a flowchart showing details of the color feature amount information extraction process according to the first embodiment of the present invention.

In this process, information which makes a color having a mode color in the color histogram of each mesh block prepared by segmenting an image to be processed into a plurality of mesh blocks and position information of the mesh block correspond to each other is extracted as color feature information.

Figure 11:
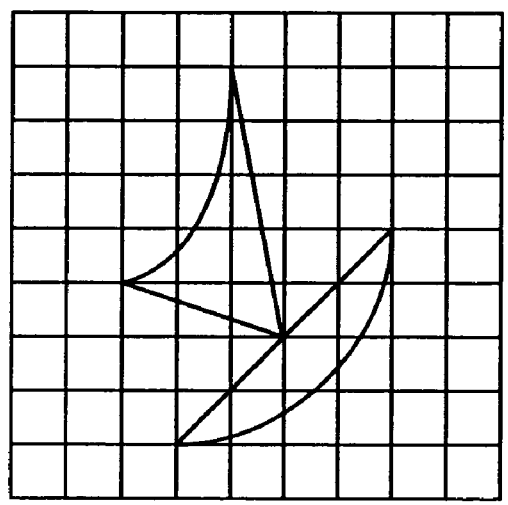
FIG. 11 is a view showing an example of image mesh block segmentation according to the first embodiment of the present invention.

In step S1020, the image is segmented into a plurality of mesh blocks. In the first embodiment, as shown in FIG. 11, the image is segmented into nine mesh blocks in the vertical and horizontal directions each. The first embodiment exemplifies segmentation into 9×9=81 mesh blocks for illustrative convenience. In practice, the number of mesh blocks is preferably about 15×15=225.

Figure 12:
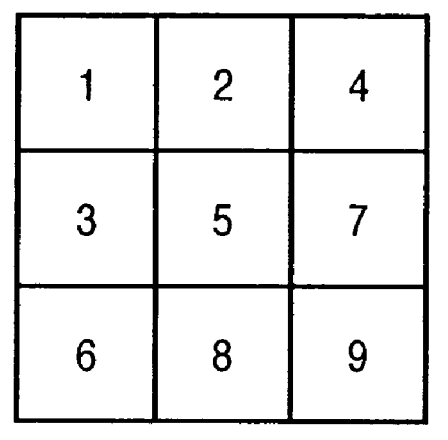

In step S1030, a mesh block of interest to be processed is set to the upper left block. The mesh block of interest is set by looking up an order decision table which decides a processing order in advance, as shown in FIG. 12.

In step S1040, whether an unprocessed mesh block of interest exists is determined. If no unprocessed mesh block of interest exists (NO in step S1040), the process ends. If an unprocessed mesh block of interest exists (YES in step S1040), the process advances to step S1050.

In step S1050, the density values of all pixels in a mesh block of interest are projected into color bins serving as subspaces prepared by dividing the color space in FIG. 13, and the color histogram of the color bins is generated.

In the first embodiment, the density values of all pixels in a mesh block of interest are projected into color bins prepared by dividing the RGB color space into 3×3×3=27, as shown in FIG. 13. In practice, the density values of all pixels in a mesh block of interest are more preferably projected into color bins obtained by dividing the RGB color space into 6×6×6=216.

In step S1060, the color bin ID of the mode color bin of the color histogram is determined as the representative color of the mesh block of interest. The determined color bin ID is stored in the storage unit 111 in correspondence with the mesh block of interest and its position.

In step S1070, the next mesh block of interest to be processed is set by looking up the order decision table in FIG. 12.

The flow then returns to step S1040 to recursively repeat the processes in steps S1040 to S1070 until no unprocessed mesh block of interest exists.

By the above process, information which makes the representative color of each mesh block of an image (image block) to be processed and position information of the mesh block correspond to each other can be extracted as color feature amount information.

A feature amount information extraction process for a text block will be explained.

When one document contains a plurality of text blocks, the following process is repeated by the total number of text blocks.

Text feature amount information of a text block is a character code obtained by performing the OCR (Optical Character Recognition) process for the text block.

In the OCR (Optical Character Recognition) process, character recognition is done using pattern matching for the character image of each character extracted from a text block, thereby acquiring a corresponding character code.

In the character recognition process, a several ten-dimensional observation feature vector of a numerical value series converted from the feature of a character image and a dictionary feature vector obtained in advance for each character type are compared to output a character type with the shortest distance as a recognition result.

Extraction of a feature vector can be realized by various known methods. For example, a character is segmented into meshes, character lines in each mesh block are counted as linear elements in each direction, and a mesh count-dimensional vector is defined as a feature.

To execute character recognition for a text block extracted by the block selection process (step S3020 or S3120), whether the text block is a horizontal/vertical writing is determined. A character string is extracted in a corresponding direction, and then a character is extracted from the character string to acquire a character image.

In determination of a horizontal/vertical writing, horizontal/vertical projection to a pixel value within the text block is formed. The text block is determined to be a horizontal writing when the variance of horizontal projection is large, and a vertical writing when the variance of vertical projection is large. In decomposition into a character string and character, for a text block of a horizontal writing, a column is extracted using the horizontal projection, and a character is extracted from the vertical projection of the extracted column. For a text block of a vertical writing, the horizontal and vertical directions are reversed.

Details of the Nup printing designation method in step S3111 of FIG. 3B will be described.

In Nup printing designation, whether the user has set Nup printing via the user interface of the MFP 100 is determined, and if Nup printing has been set, the number of pages contained in a document of one paper sheet is designated.

An example of the user interface will be explained with reference to FIG. 14.

Figure 14:
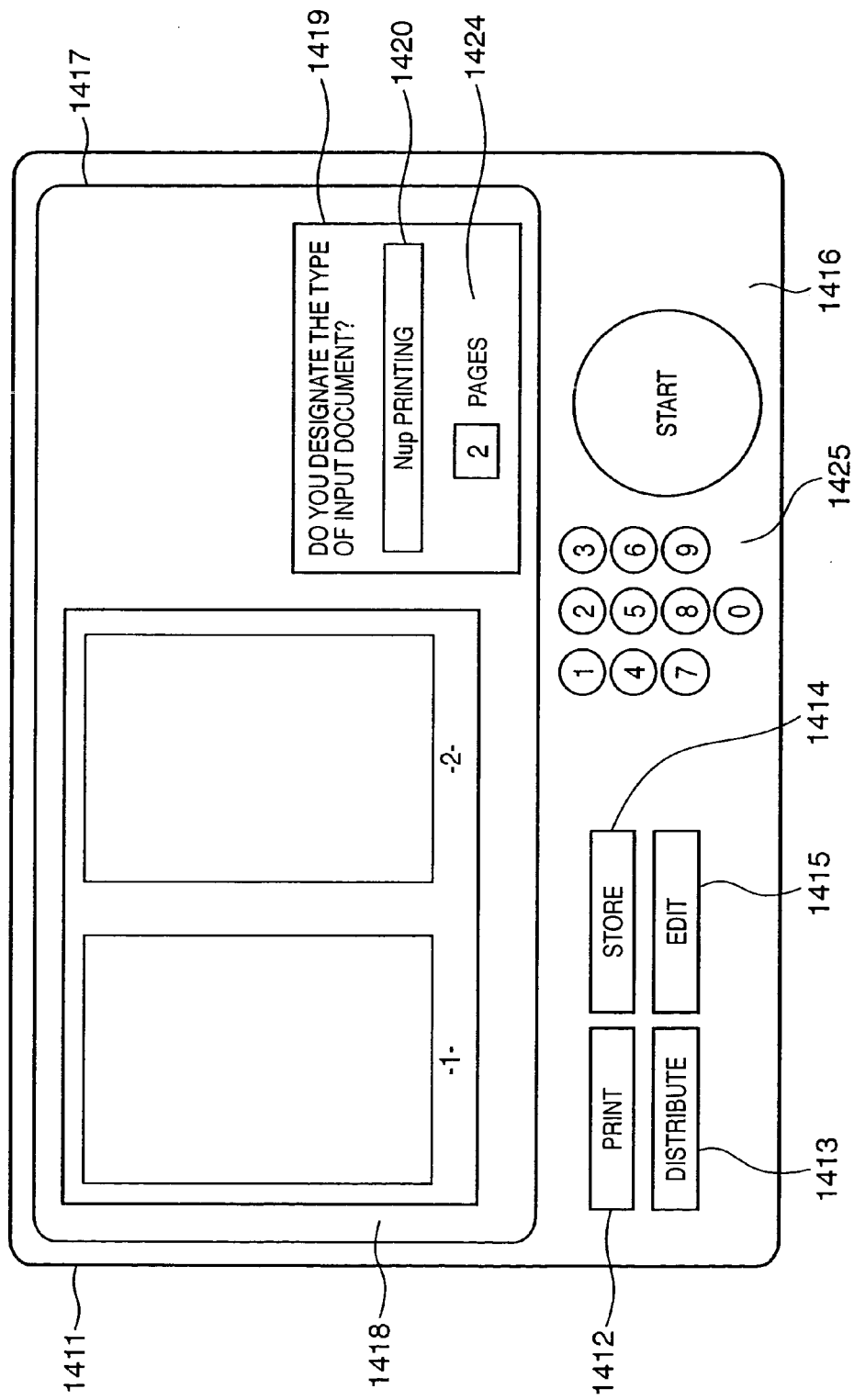
FIG. 14 is a view showing an example of a user interface according to the first embodiment of the present invention.

FIG. 14 is a view showing an example of the user interface according to the first embodiment of the present invention.

Reference numeral 1411 denotes a display/operation panel. Reference numerals 1412 to 1415 denote various function buttons. The function buttons 1412 to 1415 are used to designate printing, distribution, storage, and editing of an image to be processed.

Reference numeral 1416 denotes a start button which is clicked to execute a function selected with a function button. Reference numeral 1425 denotes a ten-key pad which allows designating the number of print sheets and the number of pages on one paper sheet in Nup printing.

Reference numeral 1417 denotes a display area which is formed by a touch panel and can be directly touched by the user to designate selection. Reference numeral 1418 denotes a paper document confirmation area where a paper document image read by the image reader 110 is reduced to a size within the area and displayed. The user can confirm the state of the paper document image in the area 1418.

Reference numeral 1419 denotes an area where the type of input document is confirmed. The area 1419 allows confirming the content of the type of read paper document. In the area 1419, reference numeral 1420 denotes a designation area for designating Nup printing. When Nup printing is designated, the display state of the designation area 1420 changes to a colored display, blinking display, highlighted display, or the like in order to exhibit the designated state.

Reference numeral 1424 denotes an area where the number of pages on one paper sheet is displayed when Nup printing is designated. Especially when no Nup printing is designated, "1" is set. The number of pages is designated using the ten-key pad 1425.

With this user interface, Nup printing can be designated for a read paper document. For Nup printing, the number of pages of a document on one paper sheet can be designated while the state is displayed.

Details of the comparison process in step S3140 will be explained with reference to FIG. 15.

Figure 15:
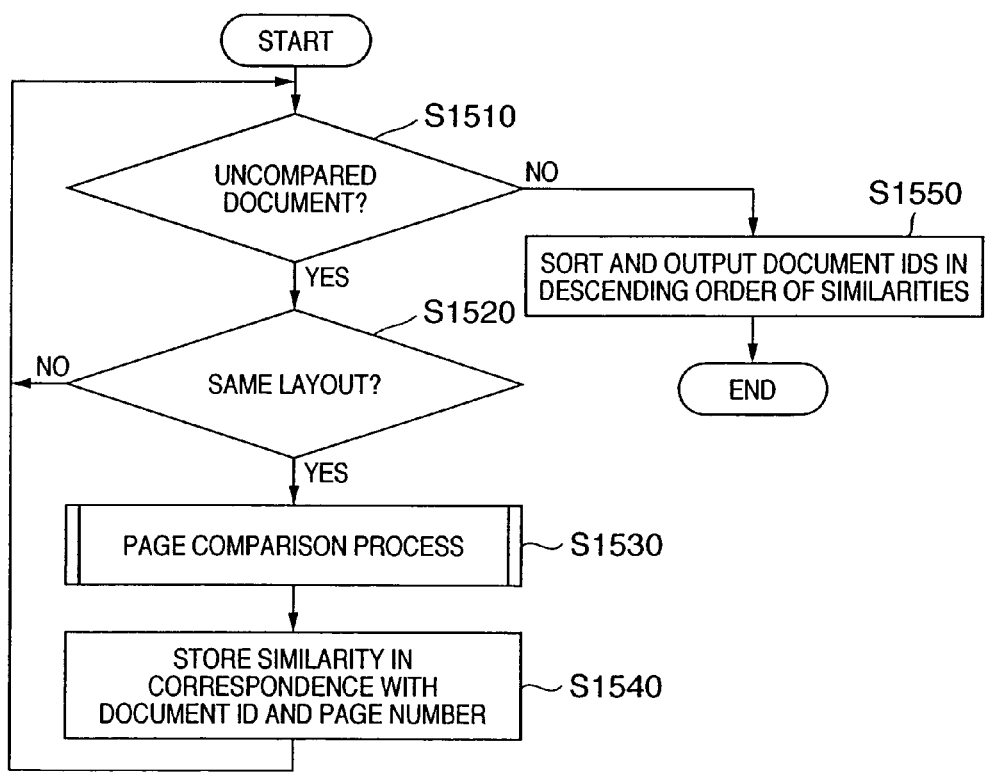
FIG. 15 is a flowchart showing details of a comparison process according to the first embodiment of the present invention.

FIG. 15 is a flowchart showing details of the comparison process according to the first embodiment of the present invention.

In step S1510, whether an uncompared original document exists is determined by referring to address information. If no uncompared original document exists (NO in step S1510), the process advances to step S1550. If an uncompared original document exists (YES in step S1510), the process advances to step S1520.

The layout is then compared. The layout includes the attribute, size, and position of a block in block information. If the layouts of a reference comparison image (paper document) and target comparison image (electronic data) coincide with each other (YES in step S1520), the process advances to step S1530. If these layouts do not coincide with each other (NO in step S1520), the process returns to step S1510.

In step S1530, a page comparison process of comparing the page of the reference comparison image (paper document) and the page of the target comparison image (electronic data) is executed. This comparison is comprehensively performed using feature amounts corresponding to a character and image in accordance with the block attribute, thereby calculating similarity. Details of this process will be described later.

In step S1540, the similarity of the document is temporarily stored in the storage unit 111 in correspondence with the document ID and page number of the target comparison image.

If all documents have been compared in step S1510 (NO in step S1510), the process advances to step S1550 to sort and output document IDs and page numbers in the descending order of similarities.

Details of the page comparison process in step S1530 will be explained with reference to FIG. 16.

Figure 16:
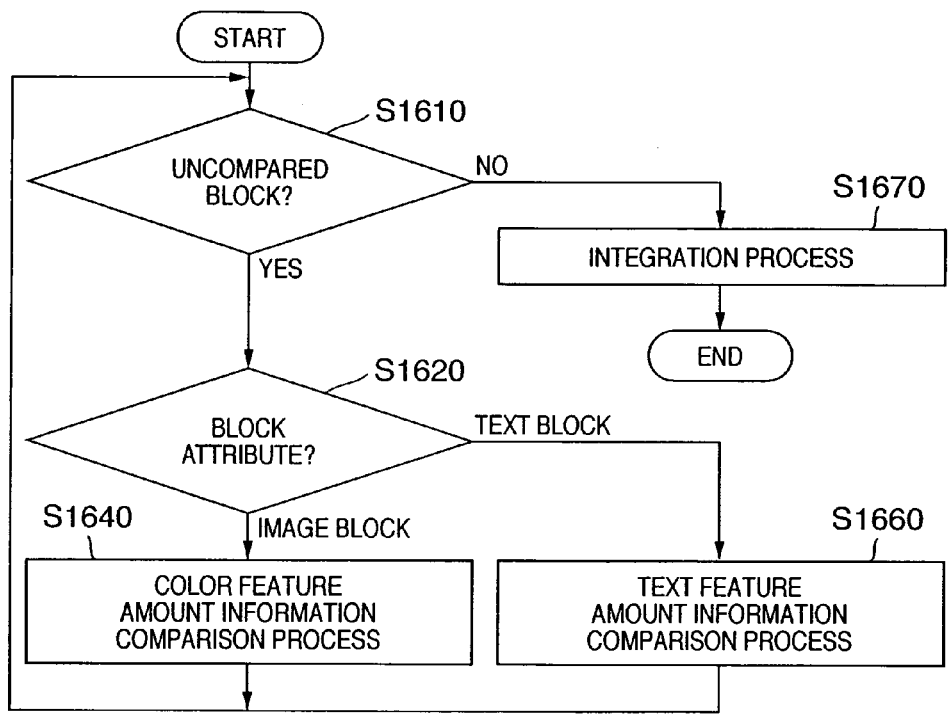
FIG. 16 is a flowchart showing details of a page comparison process according to the first embodiment of the present invention.

FIG. 16 is a flowchart showing details of the page comparison process according to the first embodiment of the present invention.

In step S1610, whether an uncompared block exists in electronic data corresponding to a document ID and page number subjected to a process is determined by referring to block information. If no uncompared block exists (NO in step S1610), the process advances to step S1670. If an uncompared block exists (YES in step S1610), the process advances to step S1620.

In step S1620, the attribute of a block to be compared is determined. If the attribute exhibits an image block, the process advances to step S1640. If the attribute exhibits a text block, the process advances to step S1660.

When the attribute exhibits an image block, a color feature amount information comparison process which is a similarity comparison between the reference comparison block and the target comparison block is executed on the basis of color feature amount information. Details of this process will be described later. The obtained similarity is temporarily stored in the storage unit 111 in correspondence with the document ID, page number, and block ID of the target comparison block.

When the attribute exhibits a text block, a text feature amount information comparison process which is a similarity comparison between the reference comparison block and the target comparison block is executed on the basis of text feature amount information. Details of this process will be described later. The obtained similarity is temporarily stored in the storage unit 111 in correspondence with the document ID, page number, and block ID of the target comparison block.

If comparisons with all blocks end in step S1610 (NO in step S1610), the process advances to step S1670 to perform an integration process of integrating the similarities of all blocks contained in the pages of the target comparison document (electronic data) that are stored in the storage unit 111 by the processes in steps S1640 and S1660, and calculating the similarity between the paper document serving as a retrieval condition and the page of the original document. Details of this process will be described later.

Details of the color feature amount information comparison process in step S1640 will be described with reference to FIG. 17.

Figure 17:
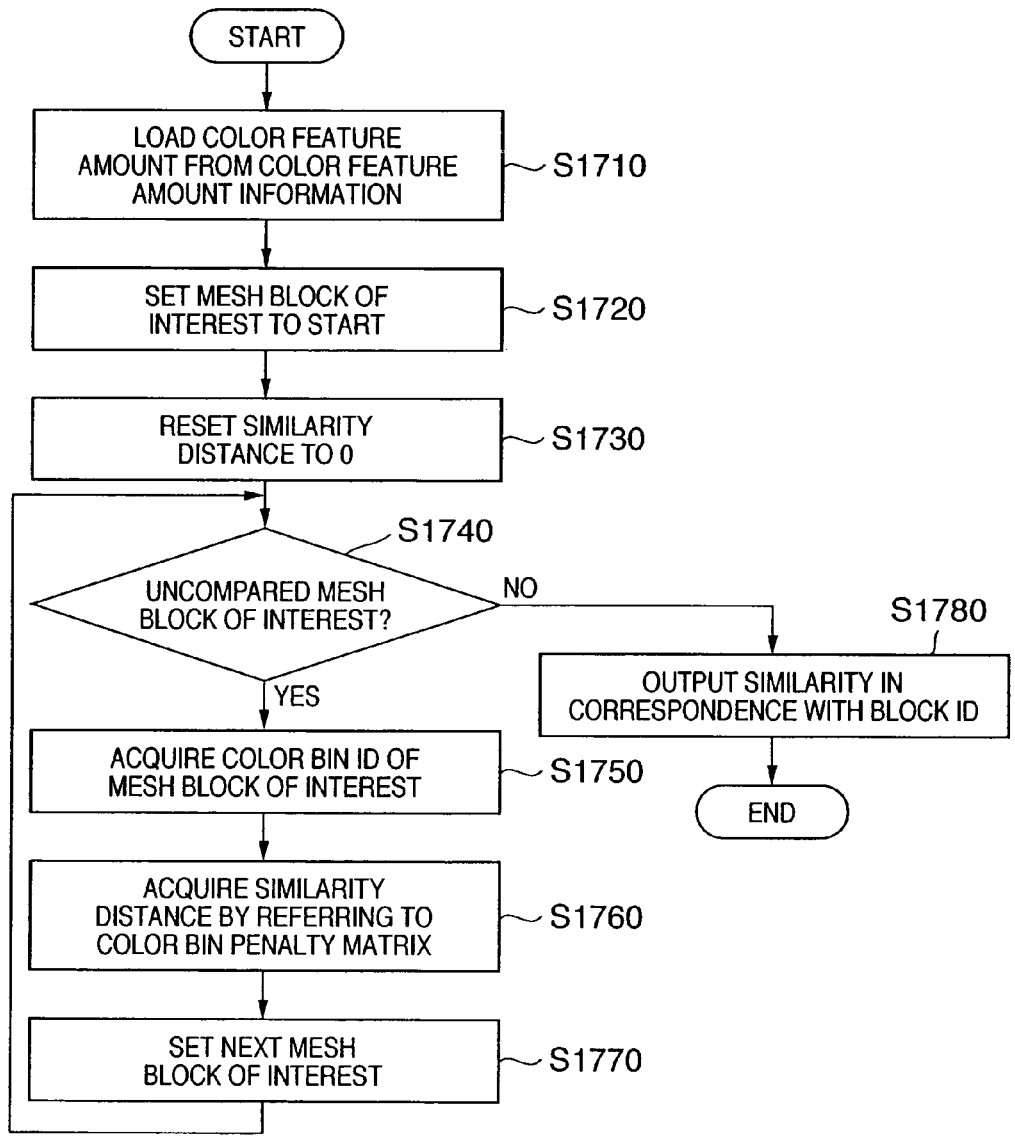
FIG. 17 is a flowchart showing details of a color feature amount information comparison process according to the first embodiment of the present invention.

FIG. 17 is a flowchart showing details of the color feature amount information comparison process according to the first embodiment of the present invention.

In step S1710, the color feature amounts of a reference comparison image block and target comparison image block are read out from color feature amount information.

In step S1720, a mesh block of interest in an image block to be processed is set as the start block. In step S1730, the similarity distance representing the similarity between the color feature amount of the reference comparison image block and that of the target comparison image block is reset to 0.

In step S1740, whether an uncompared mesh block of interest exists is determined. If no uncompared mesh block of interest exists (NO in step S1740), the process advances to step S1780. If an uncompared mesh block of interest exists (YES in step S1740), the process advances to step S1750.

In step S1750, the color bin IDs of mesh blocks of interest are acquired from the color feature amounts of the reference comparison image and target comparison image.

Figure 18:
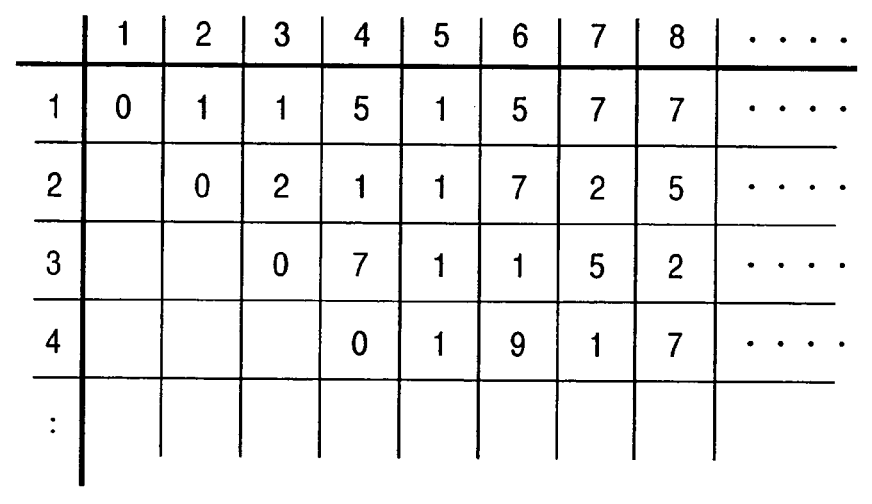

In step S1760, the local similarity distance of the mesh block of interest that corresponds to the interval between the acquired color bin IDs is acquired by referring to a color bin penalty matrix in FIG. 18. The local similarity distance is added to the similarity distance acquired in the immediately preceding process. The similarity distance is stored in the storage unit 111.

The color bin penalty matrix will be explained with reference to FIG. 18.

FIG. 18 is a view showing the structure of the color bin penalty matrix according to the first embodiment of the present invention.

The color bin penalty matrix manages the local similarity distance between color bin IDs. In FIG. 18, the color bin penalty matrix is configured such that the similarity distance is 0 for the same color bin ID, and as the difference between color bin IDs increases, i.e., the similarity decreases, the similarity distance increases. Diagonal positions for the same color bin ID have a similarity distance of 0, and color bin IDs are symmetrical about the similarity distance of 0.

In the first embodiment, the similarity distance between color bin IDs can be acquired only by referring to the color bin penalty matrix, attaining high processing speed.

In step S1770, the next mesh block of interest to be processed is set by looking up the order decision table in FIG. 12. After that, the process returns to step S1740.

If no uncompared mesh block of interest exists in step S1740 (NO in step S1740), the process advances to step S1780 to convert the similarity distance stored in the storage unit 111 into a similarity and output the similarity paired with the block ID.

Conversion into the similarity assumes that the similarity is 100% for a minimum value of the similarity distance and 0% for a maximum value of the similarity distance. The similarity to the similarity distance within this range is calculated on the basis of the difference from the minimum or maximum value.

Details of the text feature amount information comparison process in step S1660 will be described.

In this process, character codes in the text blocks of a reference comparison image and target comparison image are compared to calculate the similarity from the coincidence between the character codes.

In a comparison between a paper document serving as a retrieval condition and an original document, the similarity is ideally 100%. In practice, a recognition error may occur in the OCR process for a text block in a paper document serving as a retrieval condition. Thus, even a comparison with an original document may not attain a similarity of 100%, but has a similarity of almost 100%.

Details of the integration process in step S1670 will be explained.

In the integration process, the calculated similarities of blocks are integrated such that the similarity of a block which occupies a large part of an original document serving as a target comparison image is reflected at a higher ratio in the similarity of the whole original document.

Assume that blocks B1 to B6 in an original document have calculated similarity ratios n1 to n6. At this time, an integrated similarity ratio N of the entire original document is given by $$N = w1*n1 + w2*n2 + w3*n3 + \ldots + w6*n6 \quad (1)$$

where w1 to w6 are weighting factors for evaluating the similarities of blocks. The weighting factors w1 to w6 are calculated from ratios at which respective blocks occupy an original document. For example, for sizes S1 to S6 of blocks 1 to 6, the occupation ratio w1 of block 1 can be calculated by $$w1 = S1/(S1 + S2 + \ldots + S6) \quad (2)$$

By the weighting process using the occupation ratio, the similarity of a block which occupies a large part of an original document can be reflected at a higher ratio in the similarity of the whole original document.

Details of a process in the confirmation mode in steps S3150 and S3160 will be explained.

The confirmation mode may be designated from a user interface by the user in advance, or whether to set the confirmation mode may be determined automatically. The automatic determination method is as follows. For example, when only one original document candidate is retrieved, or when the differences in similarity between the first original document candidate and the second and subsequent original document candidates are equal to or larger than a predetermined value and the first original document candidate is more likely to be a desired original document, a "non-confirmation mode" is determined and the process advances to step S3170; otherwise, the "confirmation mode" is determined.

When an Nup-printed paper document is scanned and each candidate corresponding to each page in the scanned image does not satisfy even one of the above conditions, the "confirmation mode" is set to confirm only the page which does not satisfy the condition.

In the "confirmation mode", original document candidates are displayed in the descending order of similarities in a user interface implemented by the display 116 and input unit 113 of the MFP 100, and the user is prompted to select a desired original document from the displayed candidates.

In this manner, automatic determination of whether to execute the confirmation mode can eliminate original document selection operation by the user, reducing the number of operation steps.

An example of the user interface in the confirmation mode will be described with reference to FIG. 19.

Figure 19:
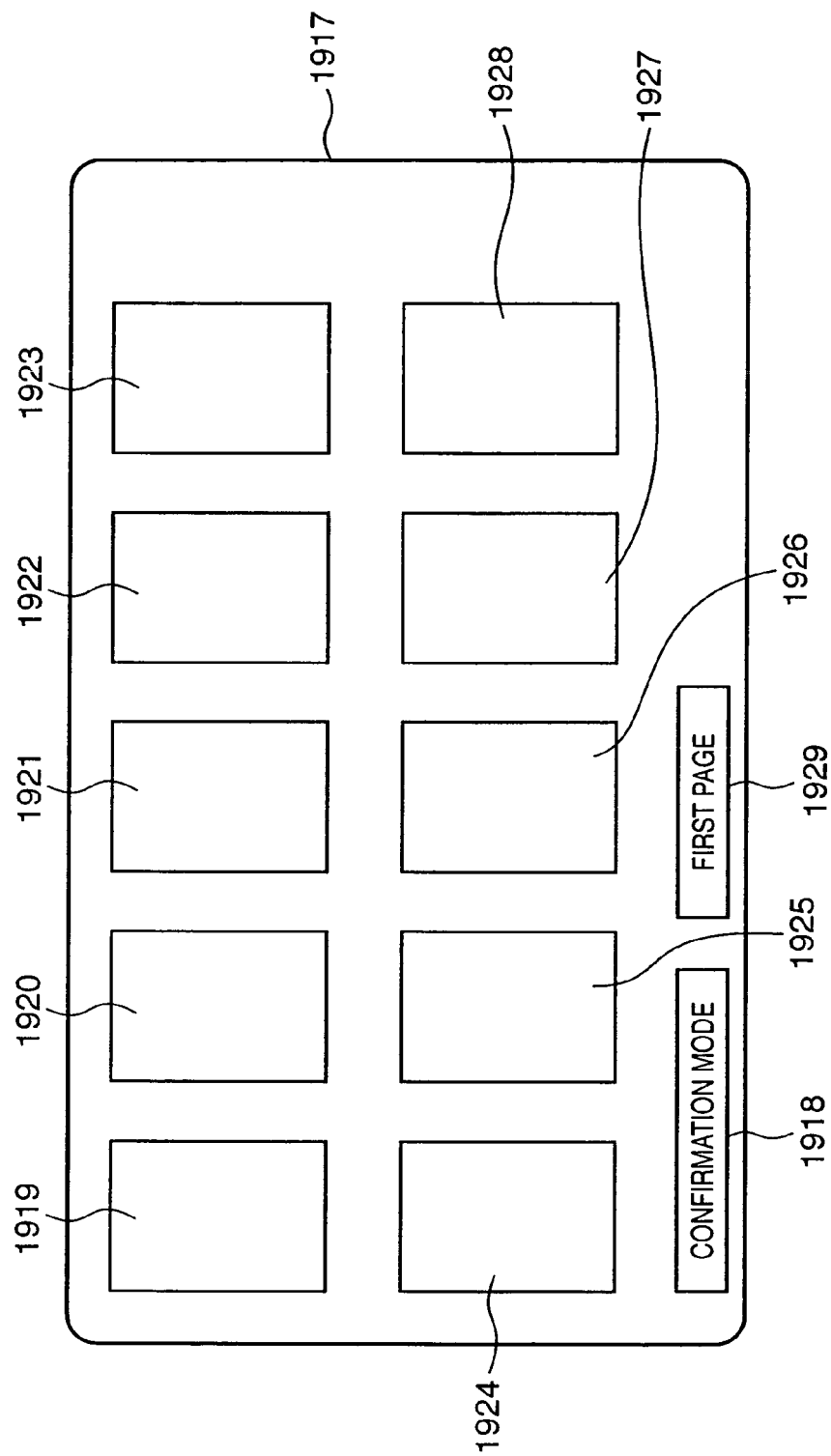
FIG. 19 is a view showing another example of the user interface according to the first embodiment of the present invention.

FIG. 19 is a view showing an example of the user interface according to the first embodiment of the present invention.

Reference numeral 1917 denotes a display area which is formed by a touch panel and can be directly touched by the user to designate selection. The display area 1917 is the same as the display area in FIG. 14.

Reference numeral 1918 denotes a mode display area which represents the confirmation mode in FIG. 19. The mode display area 1918 generally displays an automatically determined mode. By touching the mode display area 1918, the user can cyclically designate the "confirmation mode" and "non-confirmation mode".

Reference numerals 1919 to 1928 denote thumbnail images of original document candidates to be output as retrieval results. The thumbnail images are displayed in the descending order of similarities with numbers from 1919.

In this example, a maximum of 10 thumbnail images are displayed, and if more than 10 thumbnail images exist, up to 10 thumbnail images are displayed. A desired thumbnail image is selected from the thumbnail images 1919 to 1928, thereby selecting a desired original document. The selected original document can undergo various processes.

Reference numeral 1929 denotes a button which is displayed upon scanning an Nup-printed paper document and represents which of the candidates of pages in the document is displayed. By selecting the button 1929, the candidate can be switched to select the candidate of another page.

Details of the printing/distribution/storage/editing process in step S3170 will be explained.

For example, when an Nup-printed paper document is scanned and similar image retrieval is done using the scanned data, the retrieval results (original document) of a plurality of pages corresponding to the pages of the document are attained.

In printing using the retrieval results of these pages, the printing condition may be defined such that one page is printed on one paper sheet, Nup printing with a layout changed from that of original Nup printing is done, pages are printed on two sides of one paper sheet, pages are overlaid and printed on one paper sheet, or bookbinding printing is performed in a different order. Only pages designated by the user may be printed on one paper sheet.

In addition to the printing process, a process such as distribution, storage, or editing may be done for all retrieval results, or only pages designated by the user may undergo a process such as distribution, storage, or editing.

As described above, according to the first embodiment, original electronic data can be retrieved for all pages contained in an Nup-printed paper document, and various applications using the retrieved electronic data can be implemented.

<<Second Embodiment>>

In the first embodiment, whether an input paper document is Nup-printed is determined, and if so, the number of pages contained in a document of one paper sheet is designated by the user. In the second embodiment, the contents of an input paper document is analyzed, whether the paper document is Nup-printed is determined, and if so, the number of pages contained in a document of one paper sheet is automatically determined. Automatic determination is executed after input of a paper document in step S3110 of FIG. 3B according to the first embodiment.

A retrieval process according to the second embodiment will be explained with reference to FIG. 20.

Figure 20:
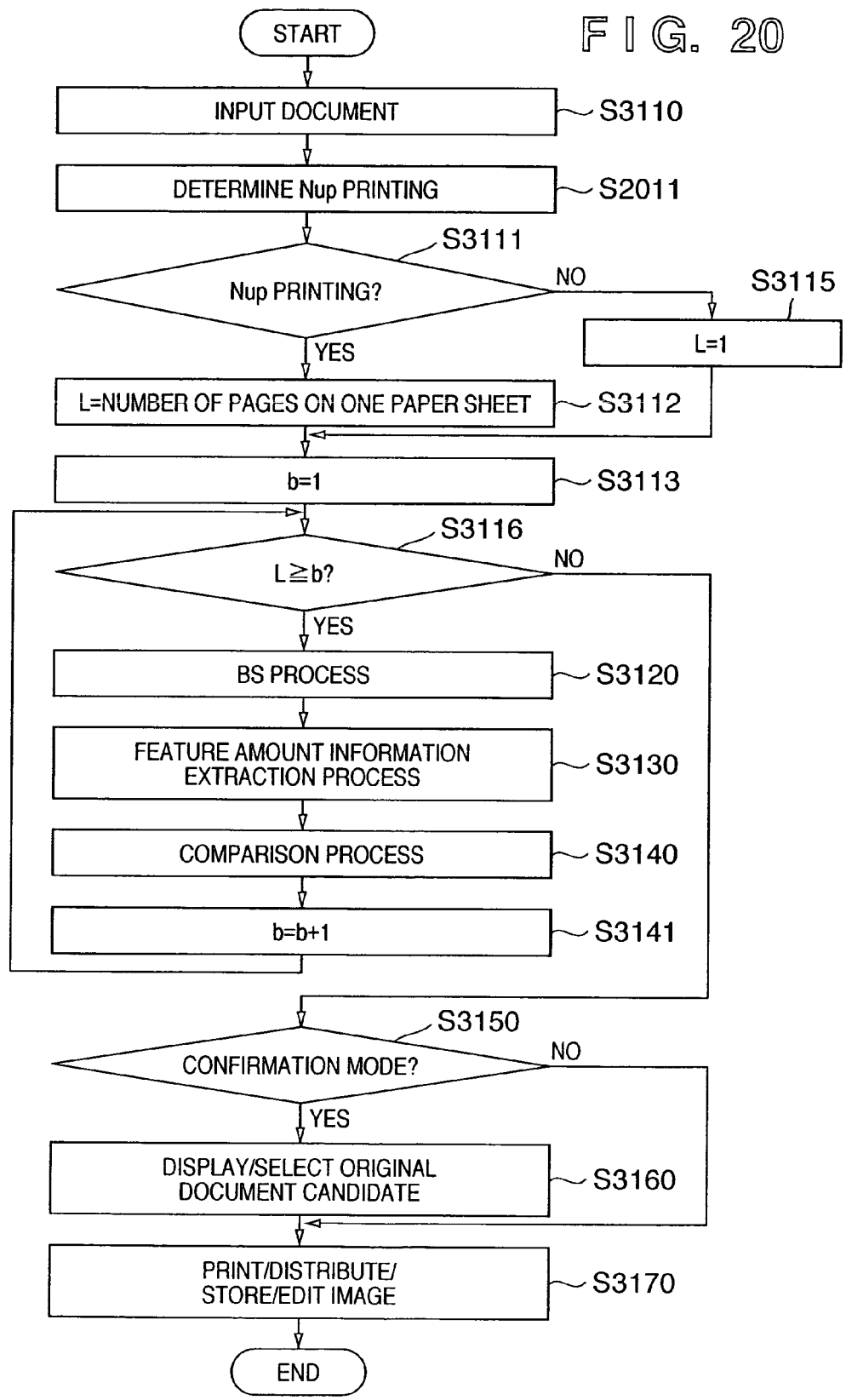
FIG. 20 is a flowchart showing a retrieval process according to the second embodiment of the present invention.

FIG. 20 is a flowchart showing the retrieval process according to the second embodiment of the present invention.

In FIG. 20, the same step numbers as in the retrieval process of FIG. 3B according to the first embodiment denote the same process steps, and details thereof will be omitted.

A paper document is input in step S3110, and an Nup printing determination process of determining whether the input scanned image is Nup-printed is determined in step S2011. A process in step S3111 is executed on the basis of the determination result.

In normal printing in which a 1-page document is printed in a paper document, the page number is printed at the upper or lower end of the paper document. In Nup printing, a plurality of page numbers are printed at equal intervals within the paper document. The second embodiment utilizes this fact to determine whether the scanned image to be processed is Nup-printed.

Nup printing of a 4-page document on one paper sheet, as shown in FIG. 21, will be exemplified.

FIG. 21 is a view showing an example of Nup-printing a 4-page document on one paper sheet according to the second embodiment of the present invention.

In FIG. 21, reference numeral 2110 denotes a region of the entire paper sheet in Nup printing. Reference numerals 2111 to 2114 denote page images of pages. Reference numerals 2115 to 2118 denote page numbers assigned to pages. Reference numerals 2119 and 2120 denote page number retrieval regions (to be described later) within bold frames.

Details of the Nup printing determination process in step S2011 will be explained with reference to FIGS. 21 and 22.

Figure 22:
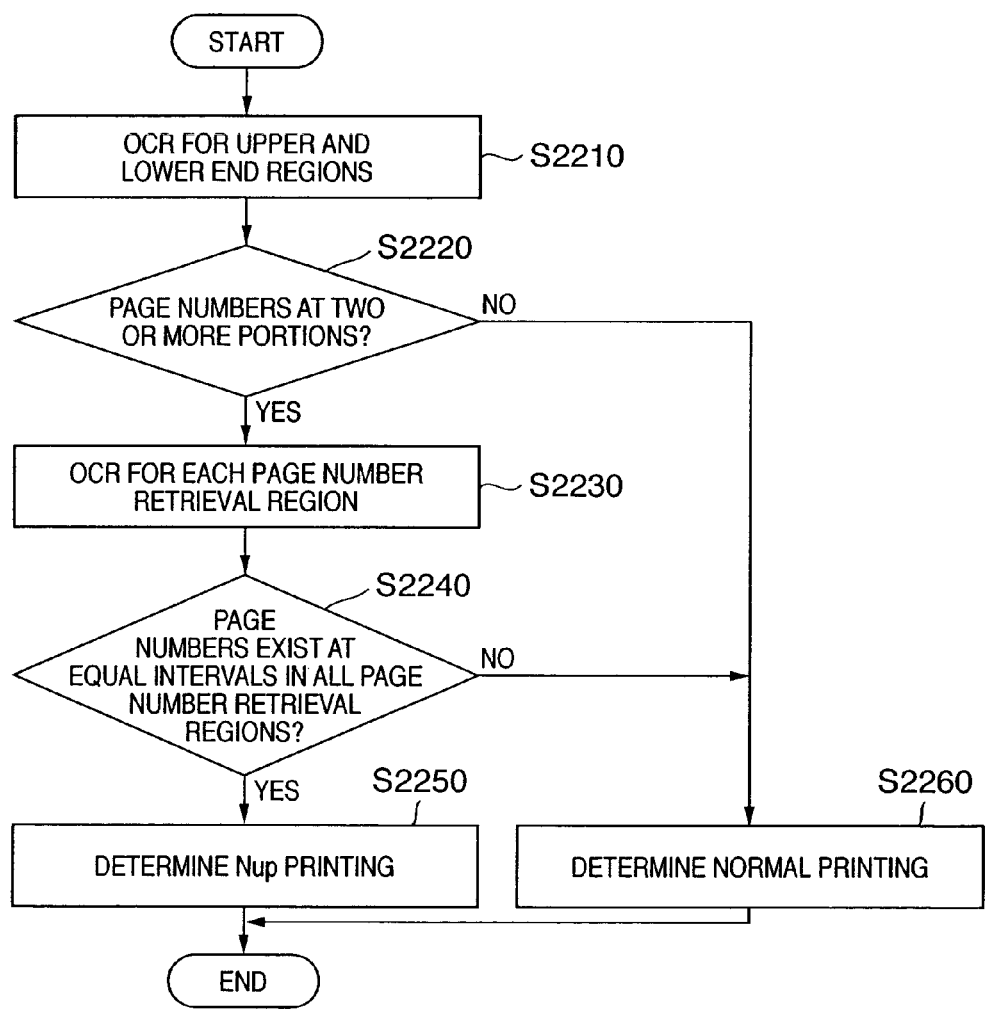
FIG. 22 is a flowchart showing details of an Nup printing determination process according to the second embodiment of the present invention.

FIG. 22 is a flowchart showing details of the Nup printing determination process according to the second embodiment of the present invention.

In step S2210, an OCR process is done for upper and lower end regions in the region 2110 of the entire paper sheet. In step S2220, whether two or more page numbers (e.g., Arabic figures or alphanumeric characters) exist at equal intervals within the upper or lower end region is determined as the process result of the OCR process. If no two or more page numbers exist (NO in step S2220), the process advances to step S2260 to determine normal printing. If two or more page numbers exist (YES in step S2220), the process advances to step S2230.

In the example of FIG. 21, the page numbers 2117 ("3") and 2118 ("4") are detected at two portions in the lower end region.

In step S2230, a page number retrieval region for retrieving another page number is set on the basis of the detected page number, and the OCR process is executed for the set page number retrieval region.

In the example of FIG. 21, the page number retrieval regions 2119 and 2120 are set for the page number images 2117 and 2118 in the longitudinal direction on the entire paper sheet containing the page numbers. The page numbers retrieval regions 2119 and 2120 undergo the OCR process.

In step S2240, whether page numbers are detected in the respective page number retrieval regions and the intervals between the page numbers in the page number retrieval regions are equal is determined. If the intervals are not equal (NO in step S2240), the process advances to step S2260 to determine normal printing. If the intervals are equal (YES in step S2240), the process advances to step S2250 to determine that the scanned image is Nup-printed.

Determination of whether the intervals are equal is executed for the intervals between page numbers including an error range which considers an error to a certain extent. That is, when the intervals between the page numbers fall within the error range, the intervals between the page numbers are determined to be equal to each other.

In the example of FIG. 21, the page numbers 2115 ("1") and 2117 ("3") are detected in the page number retrieval region 2119, and the page numbers 2116 ("2") and 2118 ("4") are detected in the page number retrieval region 2120. The intervals between the page numbers in the page number retrieval regions 2119 and 2120 are equal to each other. In this case, the scanned image is determined to be Nup-printed.

The number of pages on one paper sheet can be calculated by multiplying the number of page numbers detected in step S2210 and the number of page numbers detected in one page number retrieval region in step S2230. The number of pages is temporarily saved in a storage unit 111.

As described above, according to the second embodiment, whether a scanned image is Nup-printed is automatically determined, in addition to the effects described in the first embodiment. Whether a scanned image is Nup-printed can be determined, and if so, the number of contained pages can be determined without any cumbersome operation by the user.

In the second embodiment, the process result of the Nup printing determination process in step S2011 may be temporarily presented to the user to confirm it. At this time, the determination result is displayed as a reduced image in, e.g., a paper document confirmation area 1418 of FIG. 14. In the case of a determination error as a result of confirmation, a chance to correct the determination content can be given using an area 1419.

With this arrangement, even if a determination error occurs in the Nup printing determination process, the determination content can be corrected to prevent output of erroneous original electronic data.

<<Third Embodiment>>

In the second embodiment, a page number is detected using the OCR process in the Nup printing determination process of step S2011. However, the present invention is not limited to this. For example, a page number may be detected as follows.

Figure 23:
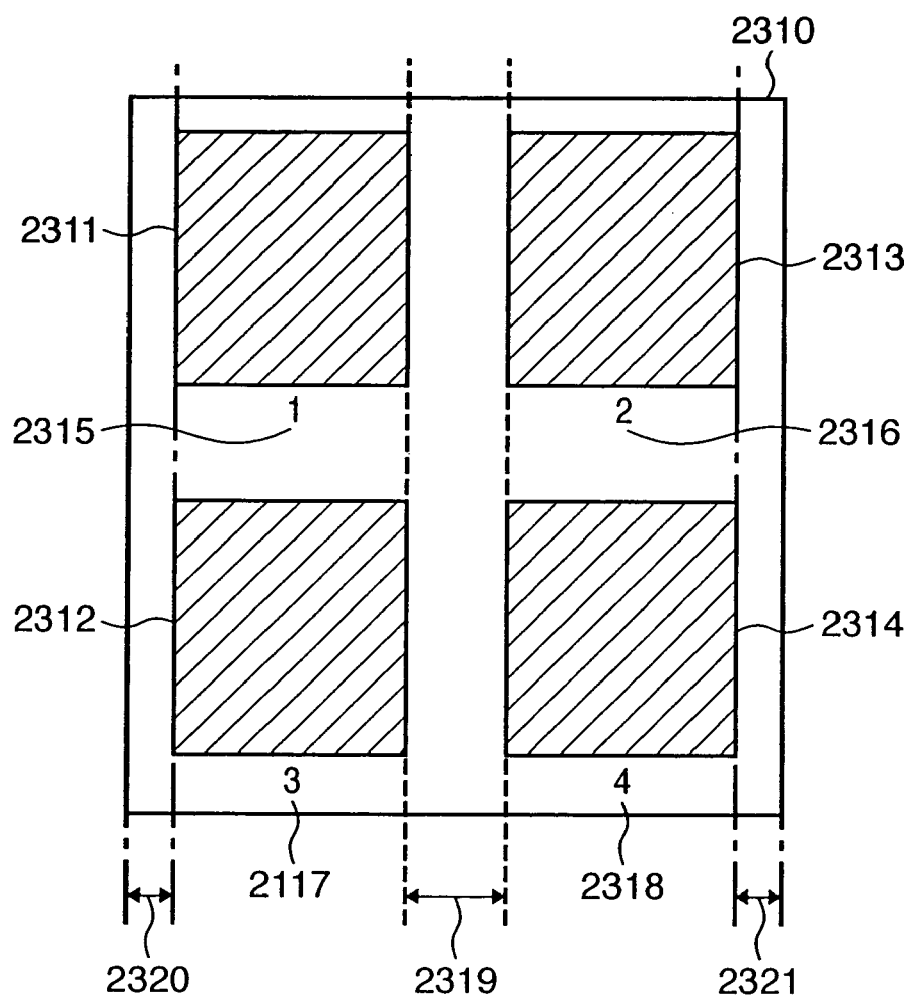
FIG. 23 is a view showing an example of Nup-printing four pages on one paper sheet according to the third embodiment of the present invention.

The third embodiment will exemplify Nup printing of a 4-page document on one paper sheet, as shown in FIG. 23.

An area 2310 corresponds to the area 2110 in FIG. 21; an area 2311, to the area 2111; an area 2312, to the area 2112; an area 2313, to the area 2113; an area 2314, to the area 2114; an area 2315, to the area 2115; an area 2316, to the area 2116; an area 2317, to the area 2117; and an area 2318, to the area 2118. A description of these areas will be omitted.

In FIG. 23, reference numeral 2320 denotes a left margin (leftmost margin) for two left pages. Reference numeral 2321 denotes a right margin (rightmost margin) for two right pages. Reference numeral 2319 denotes an intermediate margin between the two left pages and the two right pages. The intermediate margin 2319 is longer than the left margin 2320 or the right margin 2321 because the right margin for the two left pages and the left margin for the two right pages are coupled.

When the intermediate margin 2319 is detected, a scanned image can be determined to be Nup-page-printed.

Attention is paid to margins in the lateral direction in FIG. 23, but this also applies to margins in the longitudinal direction.

Figure 24:
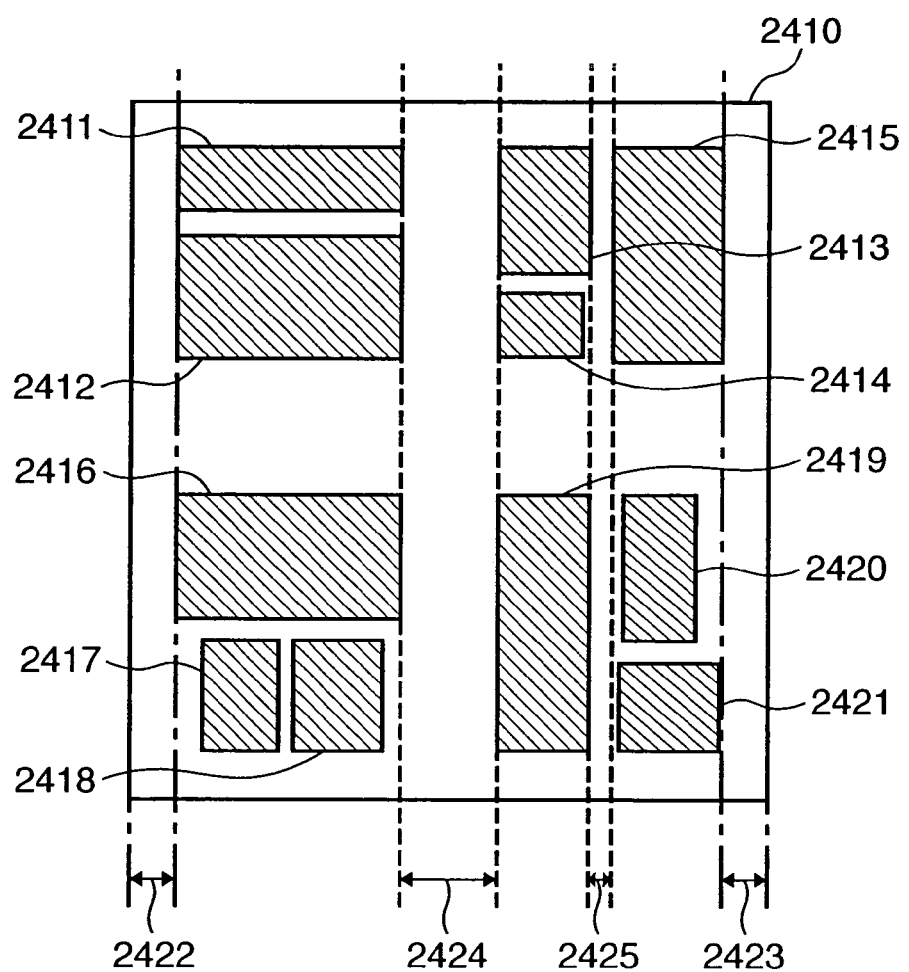
FIG. 24 is a flowchart for explaining an Nup printing determination process according to the third embodiment of the present invention.

A more detailed example will be explained with reference to FIG. 24.

Reference numeral 2410 denotes a region of the entire paper sheet. The block selection process is done for the region 2410 to obtain blocks 2411 to 2421 as block selection process results. The leftmost end of the detected blocks is detected to calculate a left margin 2422 as the difference from the left end of the entire paper region. The left margin 2422 corresponds to the left margin 2320 in FIG. 23.

Similarly, the rightmost end of the blocks is detected to calculate a right margin 2423 as the difference from the right end of the entire paper region. The right margin 2423 corresponds to the right margin 2321 in FIG. 23.

The lateral intervals between the blocks are calculated to obtain intermediate margin candidates 2424 and 2425 for the intermediate margin 2319. Of the intermediate margin candidates 2424 and 2425, the intermediate margin candidate 2424 which is longer than the left margin 2422 and the right margin 2423 is defined as an intermediate margin.

The number of pages in the lateral direction is given by the number of detected intermediate margins+1. The same process is also performed in the longitudinal direction. The results in the lateral and longitudinal directions are multiplied to calculate the total number of pages.

As described above, the third embodiment automatically determines whether a scanned image is Nup-printed, similar to the effects described in the second embodiment. Whether a scanned image is Nup-printed can be determined, and if so, the number of contained pages can be determined without any cumbersome operation by the user.

In the first embodiment, a page to be processed may be selected by touching an area where a desired page is displayed, by the user within the paper document confirmation area 1418 of FIG. 14 and designating the page. At this time, the processes from steps S3120 to S3140 are performed for only the designated page region.

Also in the second and third embodiments, processes may be done for only a designated page region by presenting to the user an Nup printing determination result and performing the same procedures. Accordingly, the user can perform a process such as printing for only a specific page in an Nup-printed paper document.

In the color feature amount information extraction process of FIG. 10, the mode color of an image to be processed is extracted as color feature information. The present invention is not limited to this, and for example, an average color may be extracted as color feature information.

The color feature amount is used as an image feature amount. However, the present invention is not limited to this, and may adopt one or an arbitrary combination of a plurality of types of image feature amounts such as a brightness feature amount expressed by a mode brightness, average brightness, or the like, a texture feature amount expressed by a cooccurrence matrix, contrast, entropy, Gabor transformation, or the like, and a shape feature amount expressed by an edge, Fourier descriptor, or the like.

Also, the block selection process is performed to segment a document to be processed into a text block and image block, and retrieval is done comprehensively using the feature amounts of these blocks. Alternatively, the entire document may be regarded as one image to retrieve an original document. If the precision permits, the original document may be retrieved using only an image block in the document.

Although electronic data is temporarily converted into a raster image, a character code or image may be directly extracted from electronic data and compared.

The text feature amount employs a character code. Instead, the part of speech of a word may be extracted in advance by matching with a word dictionary, and a noun may be defined as a text feature amount.

<<Fourth Embodiment>>

In the first embodiment, an original document to be registered is not an Nup-printed paper document (or its electronic data) but a normally printed paper document (or its electronic data). An Nup-printed paper document (or its electronic data) may also be set as an original document to be registered. In this case, similar to the retrieval process of the first embodiment, the user designates Nup printing and the number of pages contained in a document of one paper sheet (or electronic data) in a registration process.

Figure 25:
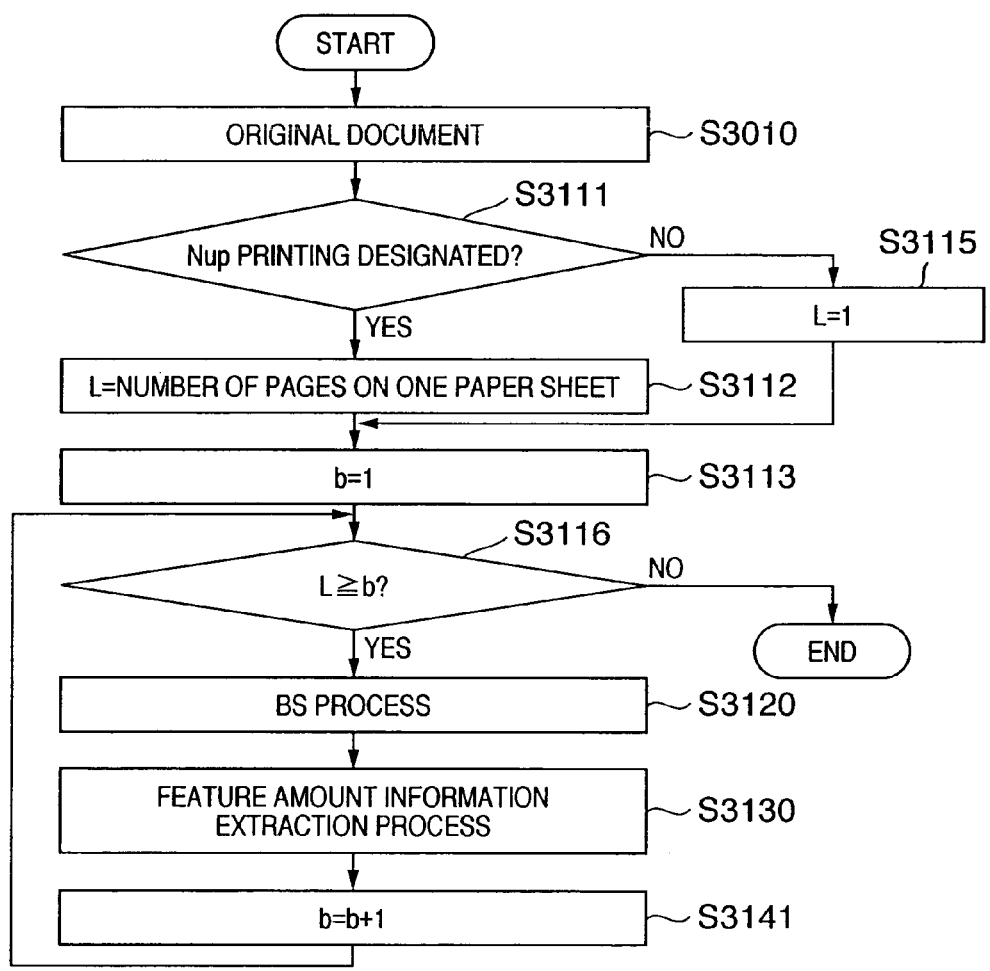
FIG. 25 is a flowchart showing a registration process according to the fourth embodiment of the present invention.

This registration process is shown in, e.g., FIG. 25. FIG. 25 shows a registration process of registering an Nup-printed paper document of one paper sheet for descriptive convenience.

Steps in FIG. 25 are implemented by almost the same step combination as some of the steps in FIGS. 3A and 3B of the first embodiment.

The registration process will be briefly described. In step S3010, an original document to be registered is input. In step S3111, whether the user has designated that the original document is an Nup-printed document is determined.

If the original document is determined to be designated as an Nup-printed document (YES in step S3111), the number of pages on one paper sheet designated by the user is set as the page count L in step S3112. If the original document is determined not to be designated as an Nup-printed document (NO in step S3111), "1" is set as the page count L in step S3115.

In step S3113, "1" is set as the default value of the variable b representing the number of processing pages in one document to be processed. Whether L is equal to or larger than b is determined as end determination of the comparison process. If L is smaller than b (NO in step S3116), the registration process ends.

If L is equal to or larger than b (YES in step S3116), an unprocessed page exists, and the process advances to step S3120 to perform a block selection process for the region of the bth page in the Nup original document. In step S3130, feature amount information of each block is extracted and stored in a storage unit 111. In step S3141, b is incremented by one, and the process returns to step S3116.

Also, a plurality of Nup-printed paper documents can be registered. This can also be implemented by combining necessary steps out of the steps in FIGS. 3A and 3B.

To register an Nup-printed paper document, the resolution may be converted such that each page image contained in a document image to be registered becomes identical to one page printed on one paper sheet. The resultant image may be registered as a document image obtained by printing one page on one paper sheet. Alternatively, a document image corresponding to an Nup-printed paper document may be directly registered.

<<Fifth Embodiment>>

In place of Nup printing designation according to the third embodiment, whether a scanned image is Nup-printed is determined, and if so, the number of pages contained in a document of one paper sheet is automatically determined to perform a registration process.

Figure 26:
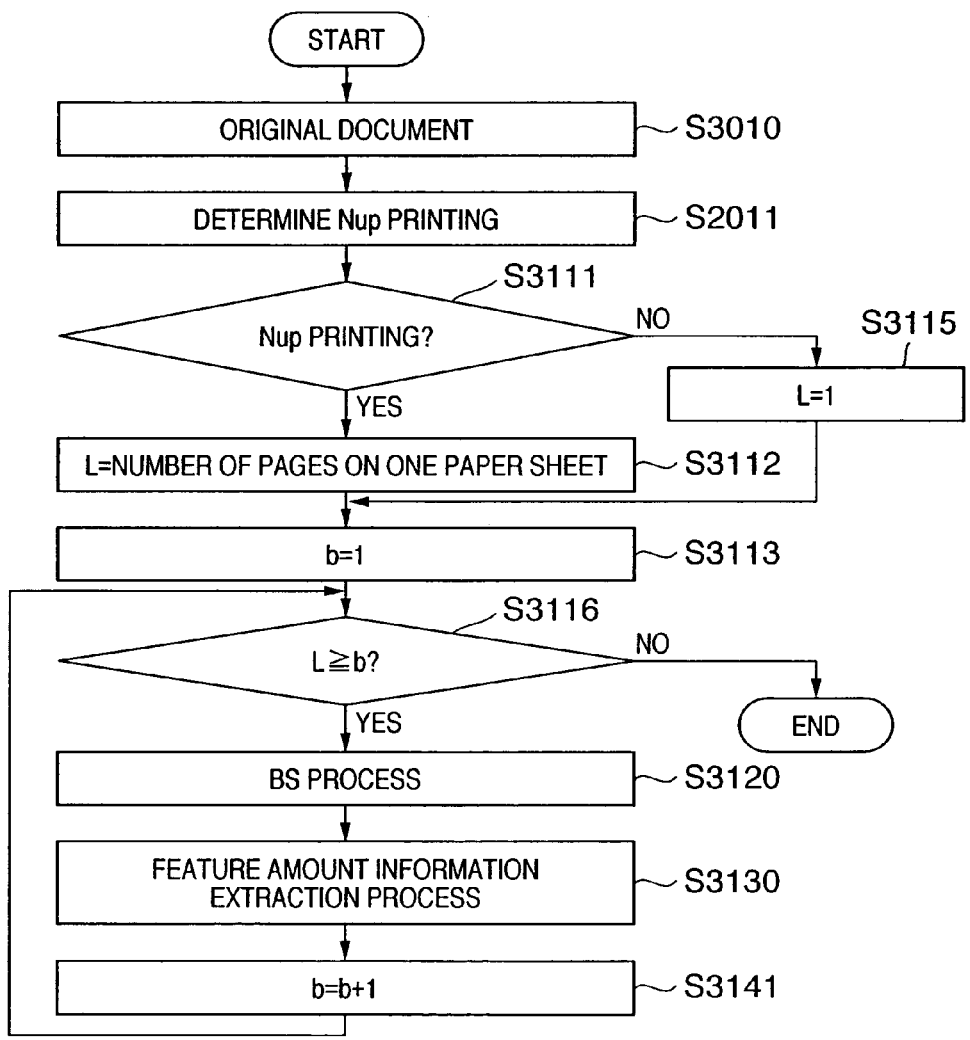
FIG. 26 is a flowchart showing a registration process according to the fifth embodiment of the present invention.

This registration process is shown in, e.g., FIG. 26. FIG. 26 shows a registration process of registering an Nup-printed paper document of one paper sheet for descriptive convenience.

Steps in FIG. 26 are realized by almost the same step combination as some of the steps in FIG. 3A of the first embodiment and FIG. 20 of the second embodiment.

The registration process will be briefly described. In step S3010, an original document to be registered is input. In step S2011, whether the original document is an Nup-printed document is automatically determined. If the original document is determined to be an Nup-printed document, the number of determined pages is set as the page count L in step S3112. If the original document is determined not to be an Nup-printed document, "1" is set as the page count L in step S3115.

In step S3113, "1" is set as the default value of the variable b representing the number of processing pages in one document to be processed. Whether L is equal to or larger than b is determined as end determination of the comparison process. If L is smaller than b (NO in step S3116), the registration process ends.

If L is equal to or larger than b (YES in step S3116), an unprocessed page exists, and the process advances to step S3120 to perform a block selection process for the region of the bth page in the Nup original document. In step S3130, feature amount information of each block is extracted and stored in a storage unit 111. In step S3141, b is incremented by one, and the process returns to step S3116.

A plurality of Nup-printed paper documents can also be registered. This can also be implemented by combining necessary steps out of the steps in FIG. 3A of the first embodiment and FIG. 20 of the second embodiment.

The embodiments have been described in detail above. The present invention can take embodiments of a system, apparatus, method, program, storage medium, and the like. More specifically, the present invention may be applied to a system including a plurality of devices or an apparatus formed by a single device.

The present invention is also achieved by supplying a software program (in the above embodiments, programs corresponding to flowcharts shown in the drawings) for realizing the functions of the above-described embodiments to a system or apparatus directly or from a remote place, and reading out and executing the supplied program codes by the computer of the system or apparatus.

Hence, the present invention is realized by program codes installed in the computer in order to realize the functional processes of the present invention by the computer. That is, the present invention includes a computer program for realizing the functional processes of the present invention.

In this case, the present invention can take any program form such as an object code, a program executed by an interpreter, or script data supplied to an OS as long as a program function is attained.

A recording medium for supplying the program includes a floppy® disk, hard disk, optical disk, magnetooptical disk, MO, CD-ROM, CD-R, CD-RW, magnetic tape, nonvolatile memory card, ROM, and DVD (DVD-ROM and DVD-R).

As another program supply method, the program can also be supplied by connecting a client computer to an Internet Web page via the browser of the client computer, and downloading the computer program of the present invention or a compressed file containing an automatic installing function from the Web page to a recording medium such as a hard disk. The program can also be realized by grouping program codes which form the program of the present invention into a plurality of files, and downloading the files from different Web pages. That is, the present invention also includes a WWW server which allows a plurality of users to download the program files for realizing the functional processes of the present invention by a computer.

The program of the present invention can also be encrypted, stored in a storage medium such as a CD-ROM, and distributed to the user. A user who satisfies predetermined conditions is prompted to download decryption key information from a Web page via the Internet. The user executes the encrypted program by using the key information, and installs the program in the computer.

The functions of the above-described embodiments are realized when the computer executes the readout program. Also, the functions of the above-described embodiments are realized when an OS or the like running on the computer performs some or all of actual processes on the basis of the instructions of the program.

The functions of the above-described embodiments are also realized when the program read out from the storage medium is written in the memory of a function expansion board inserted into the computer or the memory of a function expansion unit connected to the computer, and then the CPU of the function expansion board or function expansion unit performs some or all of actual processes on the basis of the instructions of the program.

The present invention is not limited to the above embodiments and various changes and modifications can be made within the spirit and scope of the present invention. Therefore, to appraise the public of the scope of the present invention, the following claims are made.

What is claimed is:

1. An image processing apparatus comprising:
   storage means for storing a plurality of electronic data as target comparison images;
   input means for inputting a whole image of one printed sheet as one reference comparison image by electrically reading a whole image of the one printed sheet to produce a scanned image of an already-printed sheet, wherein a plurality of page images are laid out on the one reference comparison image;
   page number setting means for determining the number of page images laid out on the scanned image of the already-printed sheet as the one reference comparison image inputted by said input means;
   segmenting means for segmenting the whole image of the scanned image of the already-printed sheet, inputted as the one reference comparison image, into a plurality of regions corresponding to the page images laid out on the one reference comparison image, based on both of the number of page images determined by said page number setting means to be laid out on the scanned image of the already-printed sheet and an orientation of the whole image of the scanned image of the already-printed sheet inputted as the one reference comparison image, and for further segmenting each of the plurality of regions corresponding to the page images into blocks having different attributes, wherein said segmenting means comprises means for performing two different segmenting operations based on different parameters, the first segmenting operation comprising a page-number-and-image-orientation-based page segmentation for segmenting the whole image of the scanned image of the already-printed sheet into regions each having a different page therein based on both the number of page images determined by the page number setting means to be laid out on the scanned image of the already-printed sheet and the orientation of the whole image of the scanned image of the already-printed sheet inputted as the one reference comparison image, and the second segmentation operation comprising a pixel-based segmentation operation for segmenting each page-image region containing one page into blocks having different attributes; extraction means for extracting each feature amount corresponding to each of the page images by extracting a feature amount from each of the blocks; and retrieval means for retrieving, from said storage means, a plurality of target comparison images corresponding to the page images laid out on the one reference comparison image by using each feature amount corresponding to each of the page images extracted by said extraction means.

2. The apparatus according to claim 1, further comprising processing means for processing an image serving as a retrieval result of said retrieval means.

3. The apparatus according to claim 1, further comprising designation means for designating the number of page images laid out on the scanned image of the already-printed sheet, based on user's operation,
wherein said page number setting means sets the number of page images laid out on the scanned image of the already-printed sheet designated by said designation means.

4. The apparatus according to claim 1, wherein said extraction means extracts at least one of an image feature amount and a text feature amount from the regions corresponding to the page images.

5. The apparatus according to claim 4, wherein the image feature amount includes one or an arbitrary combination of a color feature amount, a brightness feature amount, a texture feature amount, and a shape feature amount.

6. The apparatus according to claim 4, wherein the text feature amount includes a character code.

7. The apparatus according to claim 1, further comprising:
display means for displaying a retrieval result by said retrieval means; and
selection means for, when said display means displays a plurality of target comparison images for one of the page images as retrieval results by said retrieval means, selecting a desired image from the plurality of target comparison images.

8. The apparatus according to claim 1, further comprising designation means for designating, when the one reference comparison image contains a plurality of page images, a user desired page image from the plurality of page images based a user's operation,
wherein said extraction means extracts the feature amount from the region of the page image designated by said designation means.

9. The apparatus according to claim 2, wherein said processing means prints an image retrieved by said retrieval means under a designated printing condition.

10. The apparatus according to claim 1, further comprising designation means for designating a type of process for an image serving as a retrieval result, wherein the type of process includes one of printing, distribution, storage, and editing.

11. The apparatus according to claim 1, further comprising:
first determination means for automatically determining the number of page images laid out on the scanned image of the already-printed sheet, wherein said page number setting means sets the number automatically determined by said first determination means.

12. The apparatus according to claim 11, wherein said first determination means automatically determines the number of page images laid out on the scanned image of the already-printed sheet, by detecting the page numbers contained in the one reference comparison image, and determining whether the page numbers exist at equal intervals within a predetermined region.

13. The apparatus according to claim 11, wherein said first determination means determines whether the plurality of page images are laid out on the scanned image of the already-printed sheet as the one reference comparison image, by detecting a rightmost margin or a leftmost margin and a remaining intermediate margin of the scanned image of the already-printed sheet as the one reference comparison image, and determining whether the detected intermediate margin is larger than the rightmost margin or the leftmost margin.

14. The apparatus according to claim 11, further comprising:
display means for displaying a determination result of said first determination means; and
correction means for correcting the determination result.

15. The apparatus according to claim 1, further comprising input means for inputting a new target comparison image, and
designation means for designating a number, wherein the number indicates how many page images laid out on the new target comparison image input by said input means,
wherein said extraction means extracts each feature amount of each of the page images laid out on the new target comparison image based on regions of the page images laid out on the new target comparison image, wherein the regions of the page images are determined based on the number designated by said designation means, and wherein said storage means stores the new target comparison image and the feature amount extracted by said extraction means in correspondence with each other.

16. The apparatus according to claim 1, further comprising input means for inputting a new target comparison image, first determination means for automatically determining a number indicating how many page images are laid out on the new target comparison image,
wherein said extraction means extracts each feature amount of each of the page images laid out on the new target comparison image based on regions of the page images laid out on the new target comparison image, wherein the regions of the page images are determined based on the number determined by said first determining means, and wherein said storage means stores the new target comparison image and the feature amount extracted by said extraction means in correspondence with each other.

17. A method of controlling an image processing apparatus, comprising:

an input step of inputting, as one reference comparison image, a whole image obtained by electrically reading a whole image of one printed sheet to produce a scanned image of an already-printed sheet, wherein a plurality of page images are laid out on the one reference comparison image;

a page number setting step of determining the number of page images laid out on the scanned image of the already-printed sheet as the one reference comparison image inputted in said input step;

a segmenting step of segmenting the whole image of the scanned image of the already-printed sheet, inputted as the one reference comparison image, into a plurality of regions corresponding to the page images laid out on the one reference comparison image, based on both of the number of pages images determined in said page number setting step to be laid out on the scanned image of the already-printed sheet and an orientation of the whole image of the scanned image of the already-printed sheet inputted as the one reference comparison image, and segmenting each of the plurality of regions corresponding to the page images into blocks having different attributes, wherein the segmenting step comprises performing two different segmenting operations based on different parameters, the first segmenting operation comprising a page-number-and-image-orientation-based page segmentation for segmenting the whole image of the scanned image of the already-printed sheet into regions each having a different page therein based on both the number of page images determined by the page number setting step to be laid out on the scanned image of the already-printed sheet and the orientation of the whole image of the scanned image of the already-printed sheet inputted as the one reference comparison image, and the second segmentation operation comprising a pixel-based segmentation operation for segmenting each page-image region containing one page into blocks having different attributes;

an extraction step of extracting each feature amount corresponding to each of the page images by extracting a feature amount from each of the blocks; and a retrieval step of retrieving a plurality of target comparison images corresponding to the page images laid out on the one reference comparison image from a plurality of electronic data stored as target comparison images in a storage medium by using each feature amount corresponding to each of the page images extracted in the extraction step.

18. A non-transitory computer-readable storage medium for storing a computer executable program, the program comprising:

a program code for an input step of inputting, as one reference comparison image, a whole image obtained by electrically reading a whole image of one printed sheet to produce a scanned image of an already-printed sheet, wherein a plurality of page images are laid out on the one reference comparison image;

a program code for a page number setting step of determining the number of page images laid out on the scanned image of the already-printed sheet as the one reference comparison image inputted in said input step;

a program code for a segmenting step of segmenting the whole image of the scanned image of the already-printed sheet, inputted as the one reference comparison image, into a plurality of regions corresponding to the page images laid out on the one reference comparison image, based on both of the number of page images determined in said page number setting step to be laid out on the scanned image of the already-printed sheet and an orientation of the whole image of the scanned image of the already-printed sheet inputted as the one reference comparison image, and segmenting each of the plurality of regions corresponding to the page images into blocks having different attributes, wherein the segmenting step comprises performing two different segmenting operations based on different parameters, the first segmenting operation comprising a page-number-and-image-orientation-based page segmentation for segmenting the whole image of the scanned image of the already-printed sheet into regions each having a different page therein based on both the number of page images determined set by the page number setting step to be laid out on the scanned image of the already-printed sheet and the orientation of the whole image of the scanned image of the already-printed sheet inputted as the one reference comparison image, and the second segmentation operation comprising a pixel-based segmentation operation for segmenting each page-image region containing one page into blocks having different attributes;

a program code for an extraction step of extracting each feature amount corresponding to each of the page images by extracting a feature amount from each of the blocks; and a program code for a retrieval step of retrieving a plurality of target comparison images corresponding to the page images laid out on the one reference comparison image from a plurality of electronic data stored as target comparison images in a storage medium by using each feature amount corresponding to each of the page images extracted in the extraction step.

* * * * *